(12) United States Patent
Min et al.

(10) Patent No.: US 11,206,321 B2
(45) Date of Patent: Dec. 21, 2021

(54) MOBILE TERMINAL AND ELECTRONIC DEVICE INCLUDING SAME

(71) Applicant: LG ELECTRONICS INC., Seoul (KR)

(72) Inventors: Heyryung Min, Seoul (KR); Jungbin Lee, Seoul (KR); Minhaeng Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/961,127

(22) PCT Filed: May 9, 2019

(86) PCT No.: PCT/KR2019/005598
§ 371 (c)(1),
(2) Date: Jul. 9, 2020

(87) PCT Pub. No.: WO2020/171288
PCT Pub. Date: Aug. 27, 2020

(65) Prior Publication Data
US 2021/0160355 A1 May 27, 2021

Related U.S. Application Data

(60) Provisional application No. 62/807,257, filed on Feb. 19, 2019.

(51) Int. Cl.
*H04M 1/02* (2006.01)
*G06F 3/0488* (2013.01)
*H04M 1/21* (2006.01)

(52) U.S. Cl.
CPC .......... *H04M 1/0214* (2013.01); *H04M 1/21* (2013.01); *H04M 2201/38* (2013.01)

(58) Field of Classification Search
CPC ........ H04M 1/0214; H04M 1/21; H04M 1/02; H04M 1/725; H04M 2201/38;
(Continued)

(56) References Cited

U.S. PATENT DOCUMENTS 10,866,694 B2 * 12/2020 Kim ...................... G06F 3/0488
2005/0030255 A1 2/2005 Chiu et al.
(Continued)

FOREIGN PATENT DOCUMENTS

| CN | 103729160 | 4/2014 |
| CN | 104820549 | 8/2015 |

(Continued)

OTHER PUBLICATIONS

PCT International Application No. PCT/KR2019/005598, International Search Report dated Nov. 19, 2019, 10 pages.
(Continued)

*Primary Examiner* — Farid Seyedvosoghi
(74) *Attorney, Agent, or Firm* — Lee, Hong, Degerman, Kang & Waimey PC

(57) ABSTRACT

An electronic device that includes a mobile terminal and a case coupled to the mobile terminal, wherein the case includes a first body that is formed to accommodate a portion of the terminal body, a second body in which a second display is disposed, and a wiring unit that electrically couples the first body and the second body to transfer data received from the mobile terminal to the second display, wherein in a state where a first screen information including an input area is displayed on the first display and a second screen information is displayed on the second display, the controller is configured to capture the second screen information displayed on the second display in response to receiving a predetermined input to the input area and to
(Continued)

cause the first display to display the captured second screen information in the input area of the first screen information.

17 Claims, 25 Drawing Sheets

(58) Field of Classification Search
CPC ........ G06F 3/0488; G06F 3/0483; G06F 3/14; G06F 3/0346; G06F 1/32; G06F 1/16; G06F 9/50
See application file for complete search history.

(56) References Cited

U.S. PATENT DOCUMENTS

| | | | |
|---|---|---|---|
| 2008/0318636 A1 | 12/2008 | Kim | |
| 2011/0060988 A1* | 3/2011 | Mysliwy | G06F 3/0482 715/702 |
| 2013/0300687 A1* | 11/2013 | Park | G06F 3/04883 345/173 |
| 2014/0101577 A1* | 4/2014 | Kwak | G06F 3/1431 715/761 |
| 2014/0101579 A1* | 4/2014 | Kim | G06F 3/04883 715/761 |
| 2016/0103603 A1 | 4/2016 | Sirpal et al. | |
| 2018/0260368 A1 | 9/2018 | Vagell et al. | |

FOREIGN PATENT DOCUMENTS

| | | |
|---|---|---|
| CN | 105141801 | 12/2015 |
| CN | 105933544 | 9/2016 |
| CN | 106372473 | 2/2017 |
| CN | 106529310 | 3/2017 |
| CN | 106993099 | 7/2017 |
| CN | 107463310 | 12/2017 |
| CN | 108279836 | 7/2018 |
| CN | 108897486 | 11/2018 |
| EP | 2442240 | 4/2012 |
| JP | 2018037079 | 3/2018 |
| KR | 1020090132140 | 12/2009 |
| KR | 1020100030387 | 3/2010 |
| KR | 1020110060298 | 6/2011 |
| KR | 1020120092036 | 8/2012 |
| KR | 1020140046319 | 4/2014 |
| KR | 1020140046345 | 4/2014 |
| KR | 1020160012779 | 2/2016 |
| KR | 1020160023471 | 3/2016 |
| KR | 1020160038736 | 4/2016 |
| KR | 1020160075750 | 6/2016 |
| KR | 1020160096731 | 8/2016 |
| KR | 101737927 | 5/2017 |
| KR | 1020170093658 | 8/2017 |
| KR | 1020180061059 | 6/2018 |
| KR | 1020190001822 | 1/2019 |

OTHER PUBLICATIONS

PCT International Application No. PCT/KR2019/005597, International Search Report dated Nov. 19, 2019, 11 pages.
PCT International Application No. PCT/KR2019/005648, International Search Report dated Nov. 19, 2019, 12 pages.
PCT International Application No. PCT/KR2019/009604, International Search Report dated Nov. 19, 2019, 11 pages.
The State Intellectual Property Office of the People's Republic of China Application Serial No. 201980046008.2, Office Action dated Mar. 29, 2021, 15 pages.
The State Intellectual Property Office of the People's Republic of China Application Serial No. 201980046008 2, Office Action dated Nov. 2, 2021, 16 pages.

* cited by examiner (a)

(b)

(c)

MOBILE TERMINAL AND ELECTRONIC DEVICE INCLUDING SAME

CROSS-REFERENCE TO RELATED APPLICATIONS

This application is the National Stage filing under 35 U.S.C. 371 of International Application No. PCT/KR2019/005598, filed on May 9, 2019, which claims the benefit of U.S. Provisional Application No. 62/807,257, filed Feb. 19, 2019, the contents of which are all hereby incorporated by reference herein in their entirety.

TECHNICAL FIELD

The present disclosure relates to an electronic device that includes a mobile terminal and a case with which the mobile terminal is combined, and a method of controlling the electronic device.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

On the other hand, a recent trend is to realize these various functions using an external device operating in conjunction with the mobile terminal for more efficient utilization and to further increase the usability of the mobile terminal. In this case, it is desirable that the mobile terminal and the external device that operates in conjunction with the mobile terminal operate independently of or in conjunction with each other, whenever necessary, in order to improve user convenience and usability.

DISCLOSURE OF THE INVENTION

Therefore, to obviate those problems, an aspect of the detailed description is to provide an electronic device that includes a mobile terminal and a case with which the mobile terminal is combined, which is capable of expanding a display area of the mobile terminal by combining the case including an additional display operating in conjunction with the mobile terminal with the mobile terminal.

To obviate those problems, another aspect of the detailed description is to provide an electronic device that includes a mobile terminal and a case with which the mobile terminal is combined, which is capable of sharing a screen that is currently being viewed in an easier and faster manner, using an expanded display area.

To obviate those problems, still another aspect of the detailed description is to provide an electronic device that includes a mobile terminal and a case with which the mobile terminal is combined, which is capable of performing message inputting and at the same time searching for necessary information, using a plurality of independent display areas, and immediately sharing a result of the search using an expanded display area.

To obviate those problems, still another aspect of the detailed description is to provide an electronic device that includes a mobile terminal and a case with which the mobile terminal is combined, which is capable of capturing a screen that is currently being viewed and inserting the captured screen as message contents, with one-time inputting, without going through various steps, using an expanded display area.

To achieve these and other advantages and in accordance with the purpose of the present disclosure, as embodied and broadly described herein, there is provided an electronic device including a mobile terminal and a case with which the mobile terminal is combined, in which the mobile terminal includes a terminal body that is combined with the case, and a first display that is combined with the case, in which the case includes a first body that is formed in such a manner as to accommodate at least one portion of the terminal body, a second body in which a second display is disposed, a wiring unit that electrically couples the first body and the second body so that data which is received from the mobile terminal is transferred to the second display, and a wireless communication unit that is formed in such a manner as to transmit and receive a signal to and from the mobile terminal, and in which, in a state where first screen information including an input area is displayed on the first display and where second screen information is displayed on the second display, in response to reception of a predetermined touch input in the input area, a controller of the mobile terminal controls the wiring unit, the wireless communication unit, the first display, and the second display such that the second screen information displayed on the second display is captured and that the captured second screen information is inserted into the input area of the first screen information.

In the electronic device, an icon for performing the capture of the second screen information displayed on the second display may be displayed on the input area, and the capture of the second screen information may be performed at a point in time when a touch input is applied to the icon.

In the electronic device, the input area may include a keyboard area that receives a key input, and a display area on which a result of the received key input is displayed, and, when a touch input is applied to the icon, the controller of the mobile terminal may perform control such that the second screen information is captured and that the captured second screen information is attached to the display area after a fixed time elapsed.

In the electronic device, the first screen information may be a screen corresponding to execution of a message application, and the second screen information may be a screen corresponding to execution of an application different from the first screen information, or a home screen, and, after the captured second screen information is inserted into the input area of the first screen information, the second screen information may also maintain a state of being displayed on the second display.

In the electronic device, in response to the reception of the touch input in the input area, switching from the second screen information displayed on the second display to an image of the captured second screen information may take place, and a tool area for image editing may be displayed on one area of the image of the captured second screen information for a predetermined time.

In the electronic device, editing of the image of the captured second screen information may be performed based on a touch input that is applied to the tool area, and, in response to an editing completion input applied to the second display, the edited image may be attached to the first display.

In the electronic device, in a state where the input area is displayed, when it is determined that the second screen information displayed on the second display is uncapturable, the controller of the mobile terminal may display an icon for performing the capture of the second screen information included in the input area, in an inactivated state.

In the electronic device, when a touch input is applied successively to the icon displayed in the inactivated state, alerting information indicating that the capture is unperformable may be output on the second screen information on the second display.

In the electronic device, in a case where the second screen information is displayed on the first display, in response to reception of a screen exporting request in the first display, the controller of the mobile terminal may perform control such that the second screen information and data associated with execution of an application corresponding to the second screen information are transferred to the second display.

In the electronic device, while the transferred second screen information is displayed on the second display, based on a touch input applied to the input area of the first screen information corresponding to a message application executed on the first display, the transferred second screen information may be captured and be attached to the input area of the first screen information.

To achieve these and other advantages and in accordance with the purpose of the present disclosure, as embodied and broadly described herein, there is provided a method of operating an electronic device including a mobile terminal and a case with which the mobile terminal is combined, the mobile terminal including a first display that is combined with the case, and the case being disposed in a second display, the method including: a step of detecting a touch input applied to an input area in a state where first screen information including the input area is displayed on the first display and where second screen information is displayed on the second display; a step of transferring a command to capture the second screen information to the second display, in response to the touch input; and a step of receiving data corresponding to the captured second screen information and inserting the received data into the input area of the first screen information on the first display.

The method may further include a step of displaying an icon for performing the capture of the second screen information displayed on the second display, on the input area, and of generating the command to capture the second screen information at a point in time when a touch input is applied to the displayed icon.

In the method, the first screen information may be a screen corresponding to execution of a message application, and the second screen information may be a screen corresponding to execution of an application different from the first screen information, or a home screen, and the method may further include a step of continuing to display the second screen information on the second display after the captured second screen information is inserted into the input area.

The method may further include a step of causing switching from the second screen information displayed on the second display to an image of the captured second screen information to takes place, in response to the reception of the touch input in the input area; and a step of displaying a tool area for image editing, on one area of the image of the captured second screen information for a predetermined time.

The method may further including a step of performing editing of the image of the captured second screen information based on a touch input that is applied to the tool area within the predetermined time; and a step of inserting the edited image into the input area on the first display, in response to an editing completion input received in the second display.

Advantageous Effect

In accordance with the detailed description, in a mobile terminal and an electronic device including the mobile terminal according to the present disclosure, only with one expanded display conjunction function, screen information that is being output on a different screen is immediately shared as message contents while message conversation is in progress. With a one-time touch input, a user can perform an operation that was performed through various steps. Furthermore, display states of a keyboard area for message inputting and of the screen information that is being output on a different screen are maintained as before. Thus, user convenience and usability are further improved.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
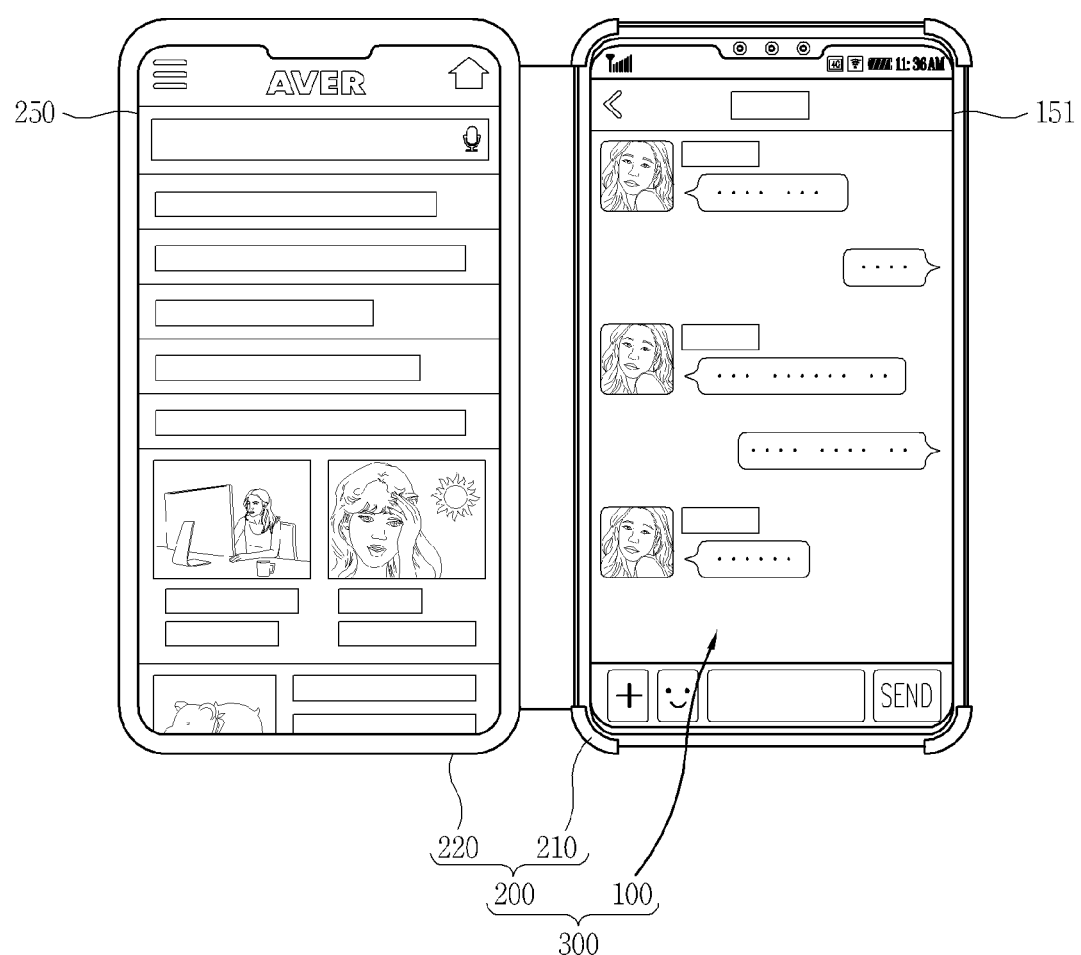
FIGS. 1A and 1B are conceptual diagrams for describing an electronic device according to the present disclosure.
Figure 1B:
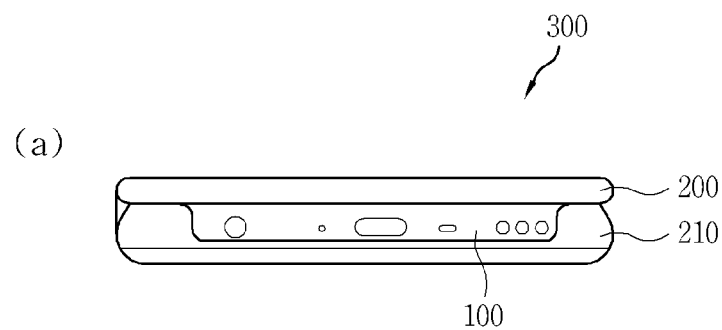
Figure 1B:
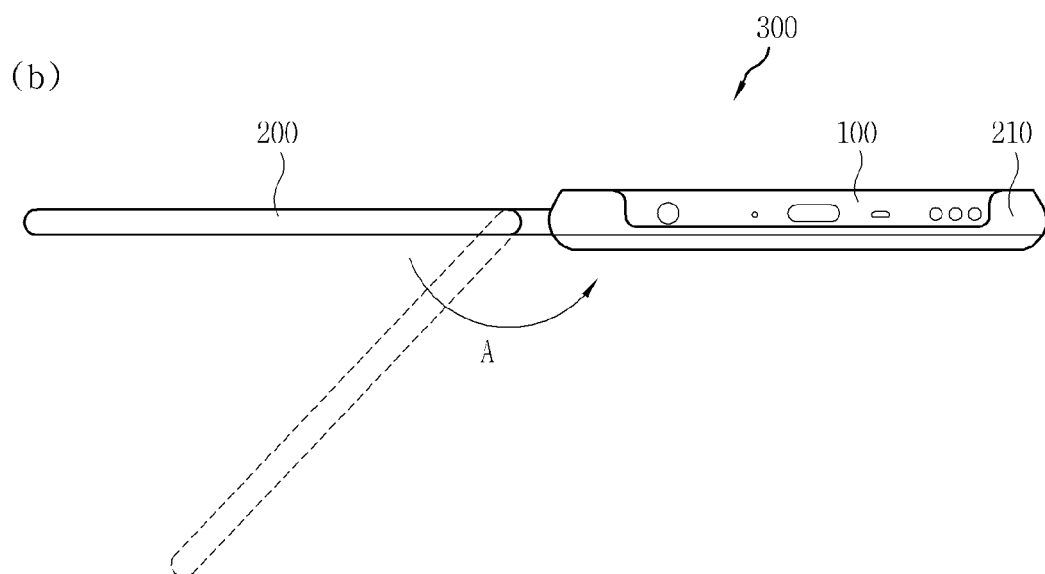
Figure 1B:
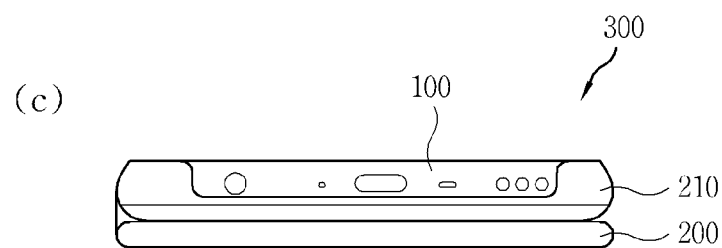

FIGS. 1A and 1B are conceptual diagrams for describing an electronic device according to the present disclosure.

With reference to the accompanying drawings, a mobile terminal 100 is combined with a case 200, and the mobile terminal 100 is combined with the case 200 to make up one electronic device 300.

In this case, the mobile terminals include a cellular phone, a smart phone, a laptop computer, a digital broadcast terminal, a personal digital assistant (PDA), a portable multimedia player (PMP), a navigation device, a slate PC, a tablet PC, a high-end subnotebook computer, a wearable device (for example, a smartwatch, smart glasses, a head mounted display (HMD)). The mobile terminal will be described in detail below with reference to FIGS. 3A and 3C.

The case 200 may be a pouch that protects the appearance of the mobile terminal 100, or covers or accommodates at least one surface of the mobile terminal 100, as an accessory to the mobile terminal 100. The case 200 is configured to be combined with the mobile terminal in order to expand a range of functions of the mobile terminal 100.

On the other hand, according to the present disclosure, information that is output in the mobile terminal is processed in association with a structure or function of the case 200. As an example of this, with reference to FIG. 1A, a display (hereinafter referred to as a second 250) that operates in conjunction with a display (hereinafter referred to as a first display 151) of the mobile terminal is provided in the case 200.

The case includes first and second bodies 210 and 220 that are coupled in a manner that is rotatable relative to each other, and the second display 250 is disposed on any one of the first and second bodies 210 and 220.

For example, the first body 210 is formed to accommodate at least a portion of the body of the mobile terminal. A rear side of the mobile terminal is accommodated in the first body 210, and the first display 151 that is disposed on a front side of the mobile terminal is exposed to the outside.

In this case, the mobile terminal 100 is detachably combined with the first body 210. In addition, the mobile terminal is formed to detect whether or not it is combined with the first body 210. For the detection, a magnet 245 is provided on one surface of the first body 210, which faces the mobile terminal 100. Furthermore, a hall sensor 143, which is formed such that a magnetic field corresponding to the magnet 245 is sensed in a case where the body of the mobile terminal is combined with the first body, is included on the rear side of the mobile terminal. When the hall sensor senses the magnetic field, the mobile terminal recognizes that the mobile terminal is combined with the case, and performs predetermined control.

For example, when the magnetic field is sensed by the hall sensor 143, a controller 180 of the mobile terminal 100 controls a power supply unit 190 such that electric current for operation is supplied to the second display 250 that is provided in the second body 220.

That is, the second display 250 that is provided in the second body 220 is configured to operate on power that is supplied from the mobile terminal 100.

On the other hand, the second display 250 is disposed in the second body 220 and thus performs a function of expanding a display area of the first display 151 or is driven independently of the first display 151. For example, contents associated with information that is output to the first display 151 are mirrored and are output on the second display 250.

In addition, execution screens for different applications are output on the first and second displays 151 and 250, respectively. As another example, it is also possible that an execution screen for one application is divided into areas and thus that the areas are displayed on the first and second displays 151 and 250, respectively.

On the other hand, the first and second displays 151 and 250 are exposed together in an open state to the outside, and the open state is defined with reference to FIG. 1B.

Furthermore, the mobile terminal 100 is configured to control screen information that is output on the second display 250. To do this, at least one of wired and wireless communication links is established between the mobile terminal 100 and the second display 250.

In addition, the mobile terminal 100 is configured such that the electric current for operation is supplied to the second display 250, and the electric current for operation is supplied from the mobile terminal 100 to the second display 250 through a wiring line provided in the case 200.

With reference FIG. 1B, the first and second bodies 210 and 220 of the case 200 is rotated relative to each other between a closed state and a full-open state.

The closed state refers to a state where the first body 210 of the case 200 covers the first display 151 of the mobile terminal 100, as a state that is illustrated in (a) of FIG. 1B, and the first display 151 is hidden by the first body 210. That is, the state where the first display 151 is covered by the second display 250 is the closed state. In the closed state, the mobile terminal 100 and the case 200 overlap each other in the thickness direction of the mobile terminal, and thus takes the form of a diary, thereby improving the portability for a user.

In addition, in this case, front surfaces of the first and second displays 151 and 250 face each other. The front surfaces are external surfaces on which time information is displayed and through which a touch input is received.

The second body 220 is rotated with respect to the first body 210 in the closed state and thus switches to the open state. The open state refers to a state where an angle that the first and second displays 151 and 250 make with respect with each other is a specific angle that is not 0 degrees, as a state where the first display 151 is not hidden by the second display 250.

(b) of FIG. 1B illustrates a state where the first and second displays 151 and 250 make an angle of 180 degrees with respect to each other in the open state. FIG. 1A, which is referred to above, illustrates the state where the first and second displays 151 and 250 make an angle of 180 degrees with respect to each other. In addition, the first and second bodies 210 and 220 are fixed at a specific angle in the open state, and, to do this, a fixation means is provided in the case 220.

As illustrated in (b) of FIG. 1B, the first and second bodies 210 and 220 are further rotated in an A direction relative to each other. Accordingly, as illustrated in (c) of FIG. 1B, the first and second bodies 210 and 220 are rotated up to 360 degrees relative to each other. Among open states, this state is defined as "full-open state." In this case, outer surfaces of the first and second bodies 210 and 220 are brought into contact with each other, and the first and second displays 151 and 250 are arranged to face toward the outside. That is, the first and second displays 151 and 250 face in opposite directions.

On the other hand, the mobile terminal is formed to detect the closed state and the open state. As an example of this, the mobile terminal includes an illumination sensor that is configured to sense ambient illumination, and the controller 180 of the mobile terminal 100 senses any one of the closed state and the open state according to illumination that is sensed by the illumination sensor.

Furthermore, the controller 180 separately detects the full-open state that is among the open states.

An electronic device 300 according to the present disclosure performs an operation of controlling the first and second displays 151 and 250 in conjunction with the open state and the closed state. As an example of this, the first and second displays 151 and 250 are driven in an inactivated state while in the closed state, and in a case where switching from the closed state to the open state takes place, at least one of the first and second displays 151 and 250 is activated.

As an example, in a case where the switching to the open state takes place, both the first and second displays 151 and 250 switch to an activated state. At this time, different home screen pages are output on the first and second displays 151 and 250, respectively, or the same home screen page is displayed in a divided manner on the first and second displays 151 and 250. Additionally, depending on the situation, various pieces of information may be output on the first and second displays 151 and 250.

As another example, in the case where the switching to the open state takes place, the first display 151 switches to the activated state, and the second display 250 maintains the inactivated state.

The second display 250 includes a touch sensor that is configured to sense a touch which is applied to the second display 250.

The second display 250 is configured to sense the touch even in the inactivated state.

Regarding the touch sensing by the touch sensor, in a case where the touch that, in the open state, is applied to the second display 250 corresponds to a predetermined-type touch, the second display 250 is driven in the activated state.

On the other hand, in a case where a touch is applied to the second display 250, the second display 250 transfers a touch signal corresponding to the touch, to the mobile terminal 100. Then, in a case where the touch to which the received touch signal corresponds is a predetermined-type touch, the mobile terminal 100 transfers a signal that corresponds to a control command to activate the second display 250, to the second display 250 side.

Then, a controller of the second display 250 activates the second display 250 based on the signal that is received from the mobile terminal 100.

On the other hand, the case employs a new structure in order to implement the operation of the electronic device, which is described above. The new structure of the case will be described in more detail below.

Figure 2A:
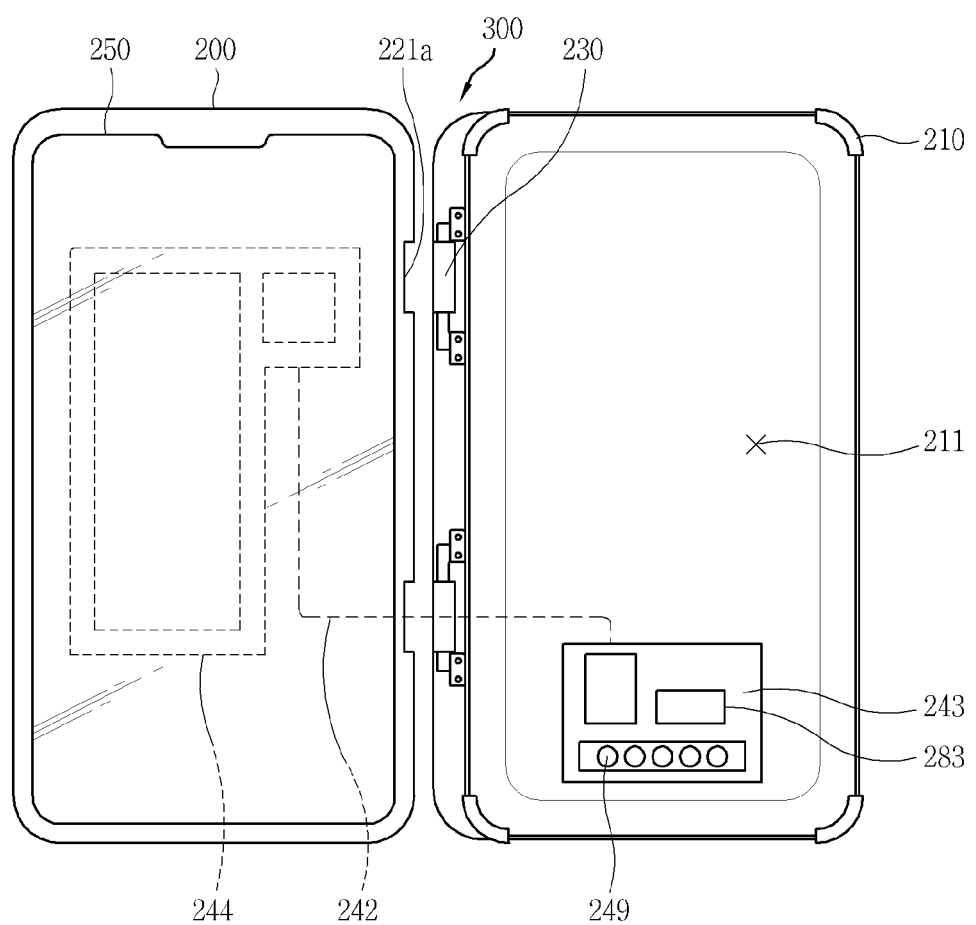
FIGS. 2A, 2B, and 2C are conceptual diagrams for describing an essential structure of the electronic device according to the present disclosure.
Figure 2B:
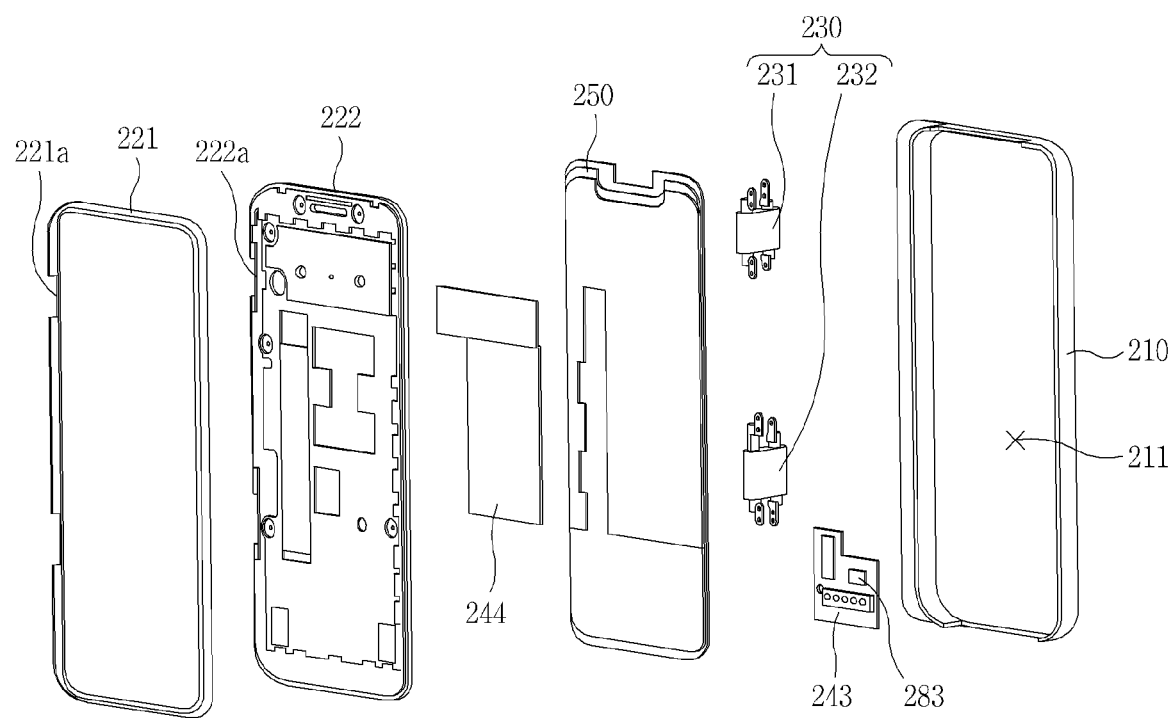
Figure 2C:
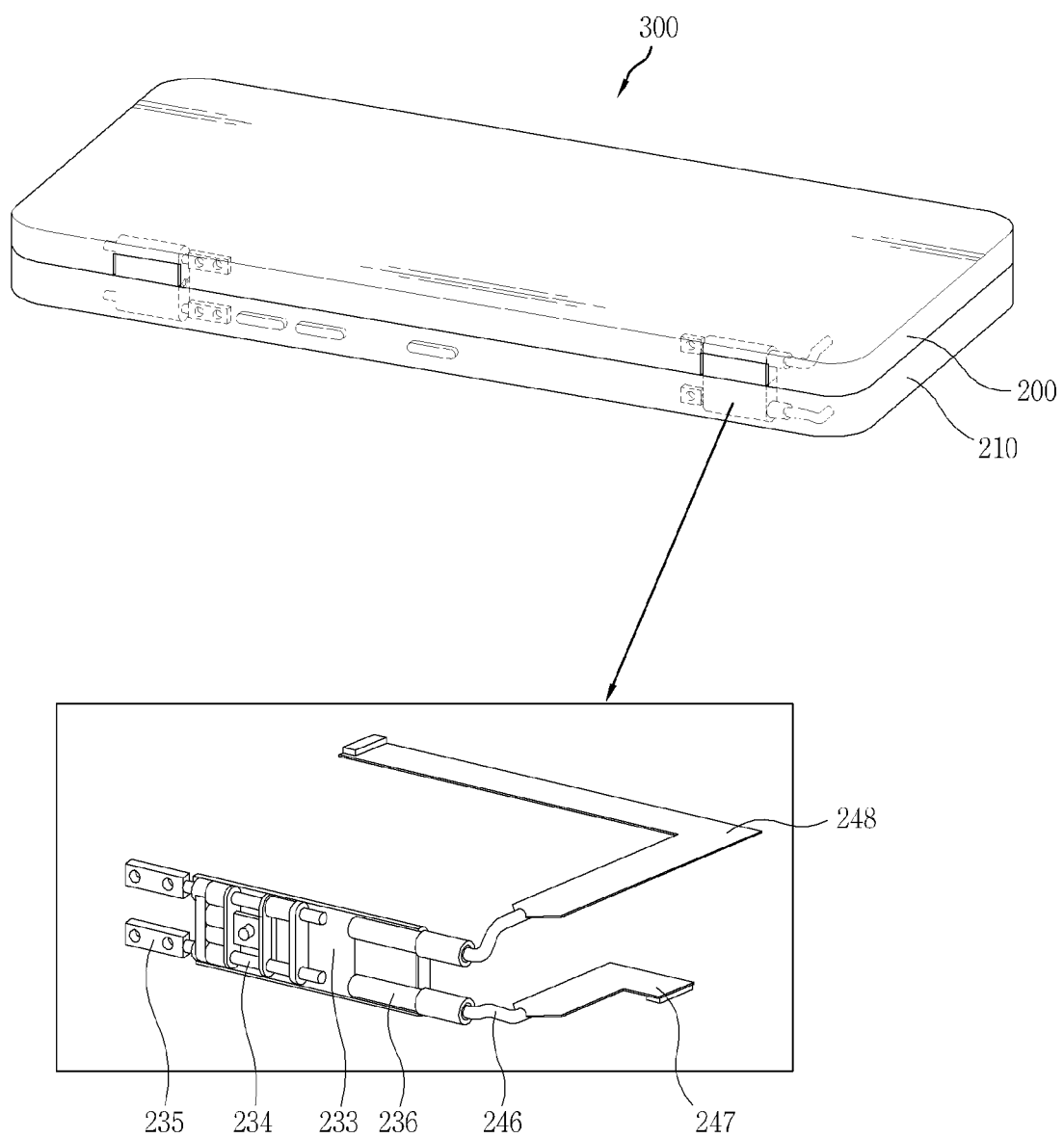

FIGS. 2A, 2B, and 2C are conceptual diagrams for describing an essential structure of the electronic device according to the present disclosure.

The first body 210 of the case 200 has an accommodation space 211 that is configured to accommodate a rear surface of the body of the mobile terminal. The accommodation space 211 in the first body accommodates at least one portion of the mobile terminal, and the rear surface of the mobile terminal is disposed on a bottom surface of the accommodation space 211. However, the present disclosure is not necessarily limited to this, and for example, the first body in the form of a plate is formed to be combined with the rear surface of the mobile terminal, or is configured to be combined with a flank surface of the mobile terminal.

With a coupling unit 230, the second body 220 in which the second display 250 is disposed is rotatably combined with the first body. That is, the coupling unit 230 is disposed between the first and second bodies 210 and 220 and combines the first and second bodies 210 and 220 such that they is rotatable relative to each other.

With reference to FIGS. 2A, 2B, and 2C, the second body 220 includes a first cover 221, a second cover 222, and the second display 250. An accommodation groove 221a in which at least one portion of the coupling unit 230 is accommodated is formed in the first cover 221. In addition, the second cover 222 is a frame with which the first cover 221 is combined and on which various electronic components are mounted. As an example of this, a second circuit board that will be described below is mounted on the second cover 222.

The second cover 222 is rotatably combined with the coupling unit 230. A groove 222a is formed in a position on the second cover 222, which corresponds to the accommodation groove 221a in the first cover 221. The coupling unit 230 is disposed in the groove 222a. In this case, the second display 250 is mounted on the second cover 222.

The coupling unit 230 includes first and second hinges 231 and 232 that are arranged apart along a flank surface of the first body 210. Each of the first and second hinges 231 and 232 includes a hinge body 233 and a hinge shaft 234.

A hinge groove (not illustrated) is formed in the hinge body 233. The hinge shaft 234 is inserted into the hinge groove, and thus the first and second bodies 210 and 220 are possibly rotated relative to each other. A plurality of hinge shafts 234 are provided, and a combining unit 235 that is combined with each of the first and second bodies 210 and 220 is disposed on one side of the hinge shaft 234.

At this time, the case 200 includes a wireless communication unit 283 and a wiring unit 242, and thus, the mobile terminal 100 controls the second display 250.

The wireless communication unit 283 is disposed in the first body 210 and performs short-range wireless communication with the mobile terminal. A wireless communication unit (hereinafter referred to as "second wireless communication") in the case 200 and a wireless communication unit (hereinafter referred to as "first wireless communication unit") that performs the short-range wireless communication are arranged in the mobile terminal 100.

The first wireless communication unit 116 (refer to FIG. 3C) transmits a wireless signal to the rear side of the mobile terminal 100. The second wireless communication unit 283 is disposed in the first body 210 to face the first wireless communication unit 116 and thus receives the wireless signal. Each of the first wireless communication unit 116 and the second wireless communication unit 283, for example, include a Keyssa chip that transmits and receives wireless data. Keyssa chips are arranged apart at distances of several centimeters or less along the thickness direction of the mobile terminal. Therefore, using a short-range communication scheme in which a transfer distance is approximately several centimeters, the first wireless communication unit 116 and the second wireless communication unit 283 perform communication.

As illustrated, the first body 210 includes a first circuit board 243 on which the second wireless communication unit 283 is disposed. The second body 210 includes a second circuit board 244 that is disposed under the second display 250 and is electrically coupled to the first circuit board 243 by the wiring unit 242. The second circuit board 244 is coupled to the second display 250 and thus performs a function of transferring a control signal received from the mobile terminal 100, to the second display 250.

That is, the second circuit board 244 transfers data that is transmitted and received between the first wireless communication unit 116 and the second wireless communication unit 283, to the second display 250.

The wiring unit 242 is a component that electrically couples the first and second bodies 210 and 220 through the coupling unit 230. A wireless signal (or data) that is received through the mobile terminal 100 and the short-range wireless communication is transferred to the second display 250 through the wiring unit 242. For this coupling, a coupling path along which the wiring unit 242 pass is formed in the coupling unit 230.

As an example of this, an accommodation space that accommodates at least one portion of the wiring unit 242 is formed in any one of the first and second hinges 231 and 232. In more detail, the first hinge 231 is positioned more toward an upper side of the mobile terminal than the second hinge 232, and the second hinge 232 is positioned more toward a lower side of the mobile terminal 100 than the first hinge 231. The second circuit board 244 is disposed adjacent to a lower side end of the case 200, and thus each of the first wireless communication unit 116 and the second wireless communication unit 283 is disposed in the case 200 or under the mobile terminal 100.

In this structure, the accommodation space is formed in the second hinge 232. The second hinge 232 includes an extension portion 236 that extends from the hinge body 233, and the cable 246 that extends to each of the first body 210 and the second body 220 is provided to the extension portion 236. A structure is employed in which the accommodation space is formed in the extension portion 236 and in which the cable 246 is accommodated in the accommodation space. First and second flexible printed circuit boards 247 and 248 are positioned at both ends, respectively, of the cable 246, and the first and second flexible printed circuit boards 247 and 248 are electrically coupled to the first and second circuit boards 243 and 244, respectively. In this structure, a signal that controls the second display 250 is transferred in a wireless manner from the mobile terminal to the first body 210 and is transferred in a wired manner to the second body 220.

On the other hand, with reference to FIGS. 2A, 2B, and 2C, a power terminal (for example, a pogo-pin) 249 that is brought into contact with a power supply terminal (not illustrated) of the mobile terminal is disposed on the first circuit board 243 such that power is supplied from the mobile terminal. The power terminal 249 is electrically coupled to the wiring unit 242 such that power is supplied to the second display 250. In this structure, the power that is supplied to the second display 250 is transferred through a wired path in the mobile terminal.

With the structure described above, the electronic device performs an operation of controlling the first and second displays 151 and 250 in conjunction with each other, using the short-range wireless communication and a wired path for power supply. First, a structure and a function of the mobile terminal will be described in detail below. Subsequently, the control operation will be described.

Figure 3A:
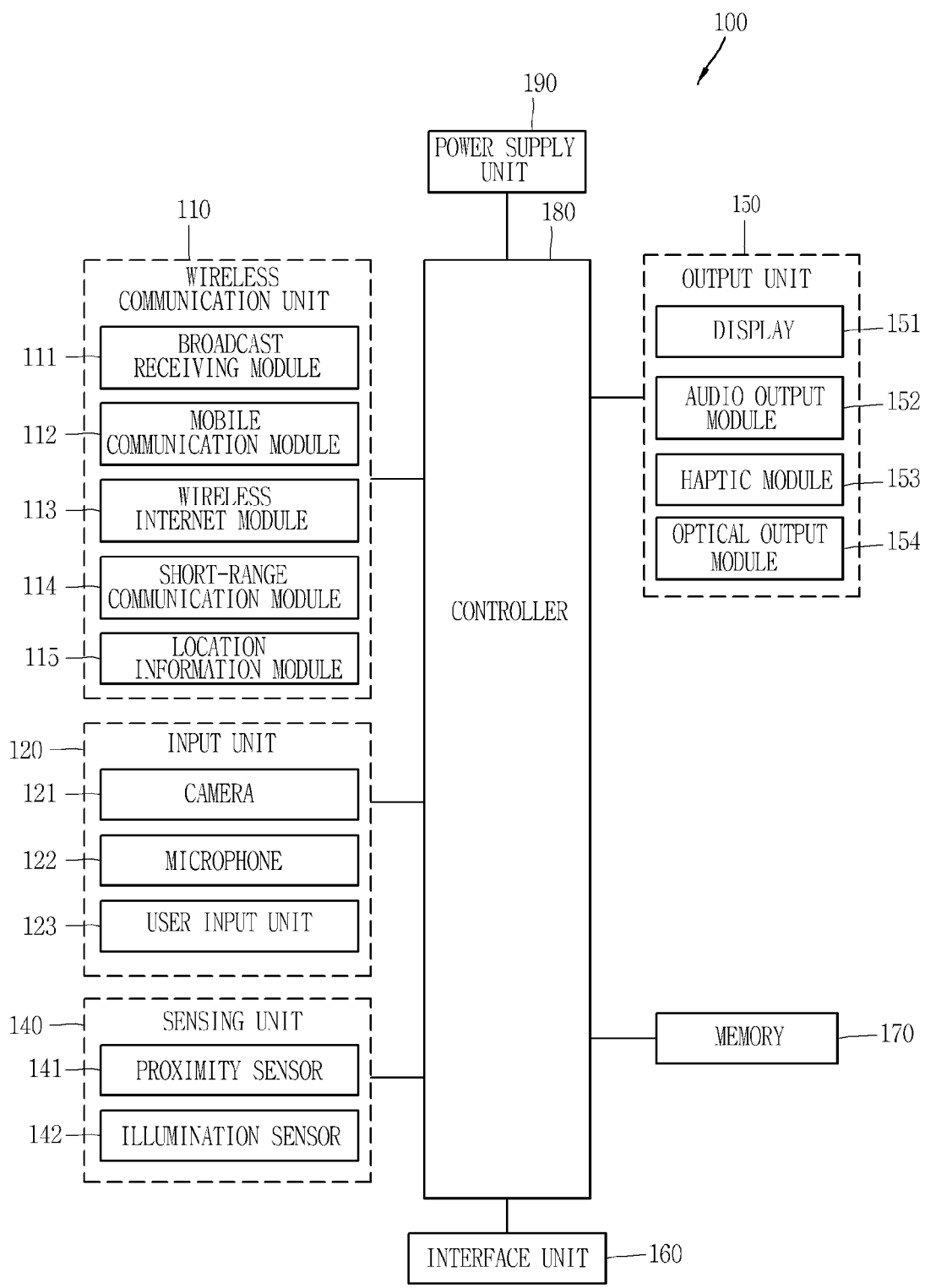
FIGS. 3A, 3B, and 3C are conceptual diagrams for describing an example of a mobile terminal according to the present disclosure.
Figure 3B:
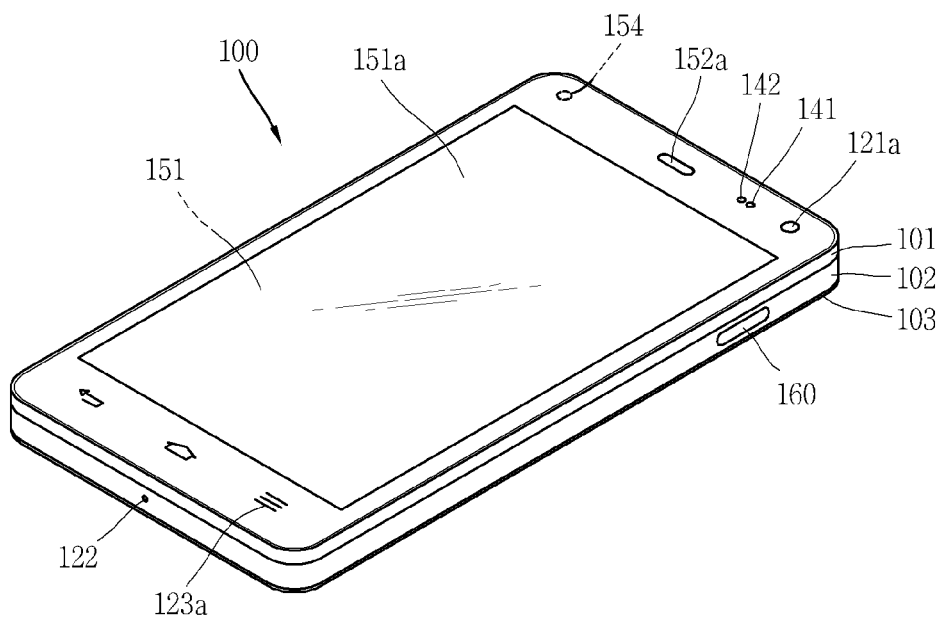
Figure 3C:
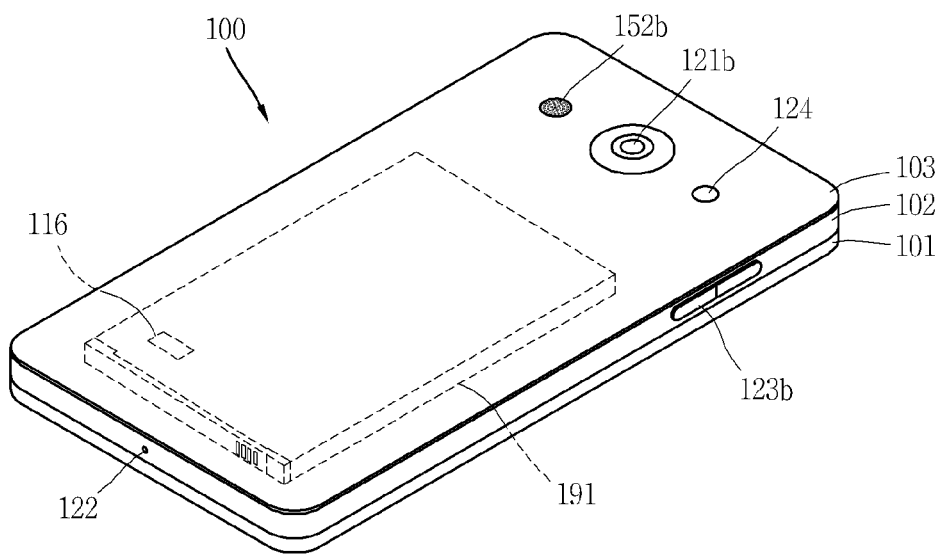

FIGS. 3A, 3B, and 3C are conceptual diagrams for describing an example of a mobile terminal according to the present disclosure. The mobile terminal 100 according to the present disclosure is coupled to the case of the electronic device, which is described above.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIGS. 3A to 3C, FIG. 3A is a block diagram of a mobile terminal in accordance with one exemplary embodiment of the present disclosure, and FIGS. 3B and 3C are conceptual diagrams illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 3A is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 3A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sensing unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact.

The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented such that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 3B and 3C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display 151 is shown located on the front side of the terminal body to output information. As illustrated, a window 151*a* of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed such that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

Hereinafter, as illustrated in FIGS. 3B and 3C, description will be given of the exemplary mobile terminal 100 in which the front surface of the terminal body is shown having the display 151, the first audio output module 152*a*, the proximity sensor 141, the illumination sensor 142, the optical output module 154, the first camera 121*a*, and the first manipulation unit 123*a*, the side surface of the terminal body is shown having the second manipulation unit 123*b*, the microphone 122, and the interface unit 160, and the rear surface of the terminal body is shown having the second audio output module 152*b* and the second camera 121*b*.

However, those components may not be limited to the arrangement. Some components may be omitted or rearranged or located on different surfaces. For example, the first manipulation unit 123*a* may be located on another surface of the terminal body, and the second audio output module 152*b* may be located on the side surface of the terminal body other than the rear surface of the terminal body.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151*a* and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display 151 may form a touch screen together with the touch sensor, and in this case, the touch screen may function as the user input unit (123, see FIG. 3A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia reproduction request sounds.

The window 151*a* of the display 151 may include a sound hole for emitting sounds generated from the first audio output module 152*a*. However, the present disclosure is not limited thereto, and the sounds may be released along an assembly gap between the structural bodies (for example, a gap between the window 151*a* and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121*a* may process image frames such as still or moving images obtained by the image sensor in a capture mode or a video call mode. The processed image frames can then be displayed on the display 151 or stored in the memory 170.

The first and second manipulation units 123*a* and 123*b* are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 3A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 3A) for supplying power to the mobile terminal 100. The power supply unit 190 may include a battery 191 which is mounted in the terminal body or detachably coupled to an outside of the terminal body.

The battery 191 may receive power via a power cable connected to the interface unit 160. Also, the battery 191 may be rechargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or expanding the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display 151 to expand the function of the mobile terminal 100. Another example of the accessory may be a touch pen for assisting or expanding a touch input onto a touch screen.

Figure 4:
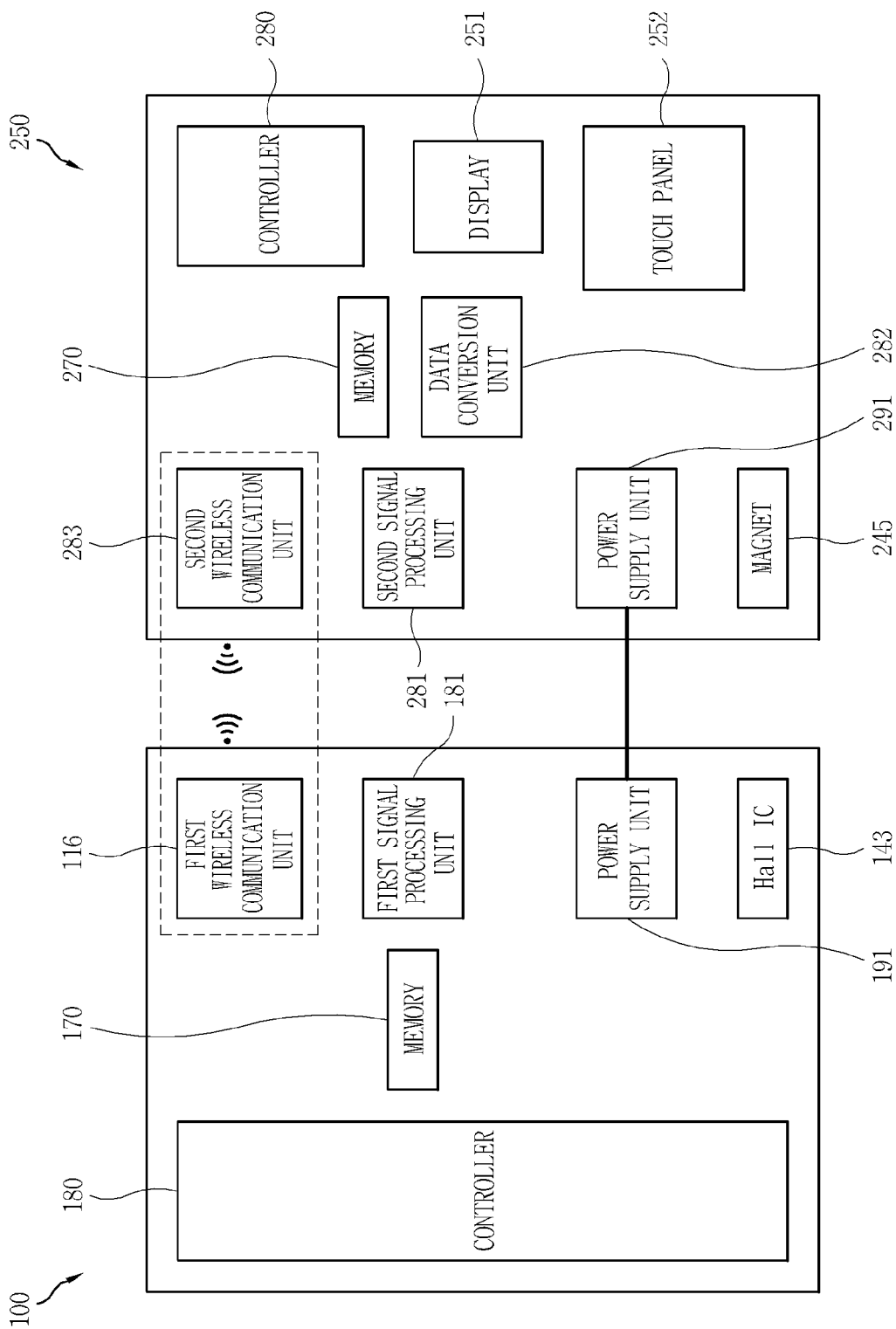
FIG. 4 is a conceptual diagram for describing a method of control between displays that are provided in the mobile terminal and a case, respectively, in the electronic device according to the present disclosure.

As described above, the electronic device 300 according to the present disclosure is configured such that a first wireless communication unit 116 (refer to FIG. 3C) provided on the rear side of the mobile terminal and a second wireless communication unit 283 provided in the first body 210 of the case 200 perform data communication with each other. A method of performing the data communication between the first and second wireless communication units 116 and 283 will be described in more detail below with reference to the accompanying drawings. FIG. 4 is a conceptual diagram for describing a method of control between the displays that are provided in the mobile terminal and the case, respectively, in the electronic device according to the present disclosure.

The mobile terminal 100 according to the present disclosure is combined with the first body 210, and, in a case where the mobile terminal 100 is combined with the first body 210, the first and second wireless communication units 116 and 283 are configured to face each other.

The first wireless communication unit 116 that is provided in the mobile terminal 100 is included in the wireless communication unit 110 that is described above with reference to FIG. 3A. The wireless communication unit 110 of the mobile terminal 100 is configured to be made up of a plurality of wireless communication units, and the plurality of wireless communication units are arranged in different positions, respectively, in the mobile terminal 100. Particularly, in the mobile terminal 100 according to the present disclosure, the first wireless communication unit 116 is provided on the rear side of the mobile terminal 100, and thus, in a case where the mobile terminal 100 is combined with the first body 210, is configured to perform the data communication with the second wireless communication unit 283 provided in the first body 210.

The first and second wireless communication units 116 and 283 according to the present disclosure are each configured with contactless connectors for the data communication. The contactless connectors, as electromagnetic connectors that form electromagnetic communication links, are arranged in different devices, respectively, and thus, electromagnetic communication links are established.

The first and second wireless communication units 116 and 283 are each configured with transceivers for converting electric signals into EM signals. The transceiver of one of the first and second wireless communication unit 116 and 283 converts electric signals into EM signals. The EM signals are received by a different transceiver, and the different transceiver converts the EM signals into electric signals.

On the other hand, according to the present disclosure, the term "transceiver" refers to a device, such as an integrated circuit (IC) that includes a transmitter (Tx) and a receiver (Rx) such that the IC is used for transmitting and receiving information (data). Generally, the transceiver is operable in a half-duplex mode (transmission and reception are alternately performed) and a full-duplex mode (transmission and reception are concurrently performed) or is configured as any one of a transmitter and a receiver. The transceiver includes separate integrated circuits for a transmission function and a reception function. The terms "contactless," "coupled-pair" and "proximity combination," as used in the present specification, are used to refer to realization of electromagnetic (EM) connection and signal transfer rather than electricity (along a wired line or through contact) between the first and second wireless communication units 116 and 283.

The term "contactless," as used in the present specification, refers to a carrier-assisted, dielectric coupling system that is capable of having an optimal range at a distance ranging from 0 to 5 centimeters. The connection is verified by the proximity of one of the first and second wireless communication units 116 and 283 to the other. Many contactless transmitters and receivers occupy a small space. Unlike a wireless link over which normal broadcasting to several points is performed, the contactless link that is established in an electromagnetic (EM) manner is a point-to-point link.

The first and second wireless communication units 116 and 283 each make a wired connection in order to transmit data from one position to another position, or form a point-to-point contactless communication link or a coupled-pair that does not need a physically wired connection. The transceivers are extremely high frequency (EHF) transceivers.

For example, in a case where the mobile terminal 100 is combined with the first body 210, the first wireless communication unit 116 of the mobile terminal 100 and the second wireless communication unit 283 in the first body 210 are configured to face each other and are configured to be positioned within a predetermined distance. Therefore, the contactless communication link is formed between the first and second wireless communication units 116 and 283.

Data is transmitted between the mobile terminal 100 and the second display 250 through the EHF transceivers that are included in the first and second wireless communication units 116 and 283, respectively.

The second wireless communication unit 283 that transmits and receives data to and from the second display 250, that is, the EFH transceiver, as described with reference to FIGS. 2A, 2B, and 2C, is provided in the first body 210.

The second wireless communication unit 283 provided in the first body 210 is configured to transmit and receive data in a wired manner to and from the second display 250 through the wiring unit 242 included in the coupling unit 230.

On the other hand, as described above, the mobile terminal 100 is combined with the first body 210, and thus the EHF transceivers that are included in the first and second wireless communication units 116 and 283, respectively, are combined, in proximity, with each other.

The coupled-pair of the EHF transceivers of each of the first and second wireless communication units 116 and 283 provides a contactless data route, path, or channel. In some embodiments, data paths are unidirectional (for example, a flow of data from the mobile terminal 100 to the second display 250 over a specific path) or are bidirectional (for example, a bidirectional flow of data between the mobile terminal 100 and the second display 150 over a specific path).

The first and second wireless communication units 116 and 283 according to the present disclosure are configured in such a manner as to transmit and receive various types of data. For example, various types of data include graphical data, audio data, video data, touch event data, and a combination of these.

On the other hand, that is, the second display 250 provided on the second body 220 is configured to operate on power that is supplied from the mobile terminal 100.

The power at this time, as described above, is supplied up to the second display 250 through the wiring unit 242 provided on the first circuit board 243 and the coupling unit 230 that are electrically connected to the mobile terminal 100, and through an electrical coupling path to the second circuit board 244 provided in the second body 220.

That is, as illustrated in FIG. 4, a power supply unit 191 of the mobile terminal 100 is configured to supply electric current (or power) for operation to a power supply unit 291 of the second display 250 through the wiring unit 242 provided on the first circuit board 243 and the coupling unit 230, and through the electrical coupling path to the second circuit board 244 provided in the second body 220.

On the other hand, as described, the mobile terminal 100 is detachably combined with the first body 210. In addition, the mobile terminal is formed to detect whether or not it is combined with the first body 210. For the detection, a magnet 245 is provided on one surface of the first body 210, which faces the mobile terminal 100. Furthermore, a hall sensor 143, which is formed such that a magnetic field corresponding to the magnet 245 is sensed in a case where the body of the mobile terminal is combined with the first body, is included on the rear side of the mobile terminal. When the hall sensor senses the magnetic field, the mobile terminal recognizes that the mobile terminal is combined with the case, and performs predetermined control.

For example, when the magnetic field is sensed by the hall sensor 143, a controller 180 of the mobile terminal 100 controls a power supply unit 190 such that the electric current for operation is supplied to the second display 250 provided in the second body 220.

That is, the second display 250 provided in the second body 220 is configured to operate on the power that is supplied from the mobile terminal 100.

In this manner, when the electric current for operation is supplied to the second display 250, a system of the second display 250 is booted and initialized and is in a standby state where the system is operable.

At this time, the second display 250 is in any one of the activated state and the inactivated state, and even in a state where the second display 250 is in the inactivated state, a touch sensor (or a touch panel 252) provided in the second display 250 is configured to be driven in the activated state and to sense a touch that is applied to the second display 250.

On the other hand, in a case where the second display 250 is activated, the mobile terminal 100 transfers screen information (or a digital image signal) that is to be output on a display 251 provided in the second display 250, to the second wireless communication unit 283 side, through the first wireless communication unit 116. At this time, the image signal at this time, as described above, is transferred as a signal in a frequency band of 60 GHz in a wireless manner through a wireless connector.

The second display 250, as described above, receives data (for example, a digital image signal or the like) from the first wireless communication unit 116 through the second wireless communication unit 283 and the second circuit board 244. At this time, the digital image signal is converted by a data conversion unit 282 into data in a format that is possibly output on the second display 250. For example, the second display 250 is configured with an LCD panel. At this time, a digital image signal in DP format, which is received from the mobile terminal 100, is converted by the data conversion unit 282 into a data format (a MIPI format) that is receivable by the LCD panel and is transferred and output to and on the display 251.

On the other hand, types of pieces of data is predetermined that are transmitted and received through the first and second wireless communication units 116 and 283. For example, only data that corresponds to an image signal is transmitted and received through the first and second wireless communication units 116 and 283.

At this time, it is possible that signals necessary for transfer between the mobile terminal 100 and the second display 250, such as a communication control signal, a touch signal, and a brightness control signal, except for the image signal, go through the first and second signal processing units 181 and 281 through a multiple-input channel and then are transmitted and received through the first circuit board 243 and the power terminal (for example, the pogo-pin) 249. On the other hand, it is possible that initialization or the like of the second display 250 is controlled by the controller included in the second display 250.

A method of screen control between the first display and the second display provided in the mobile terminal and the case, respectively, of the electronic device 300 according to the present disclosure will be described in more detail below with reference to FIGS. 5A to 5H.

Figure 5A:
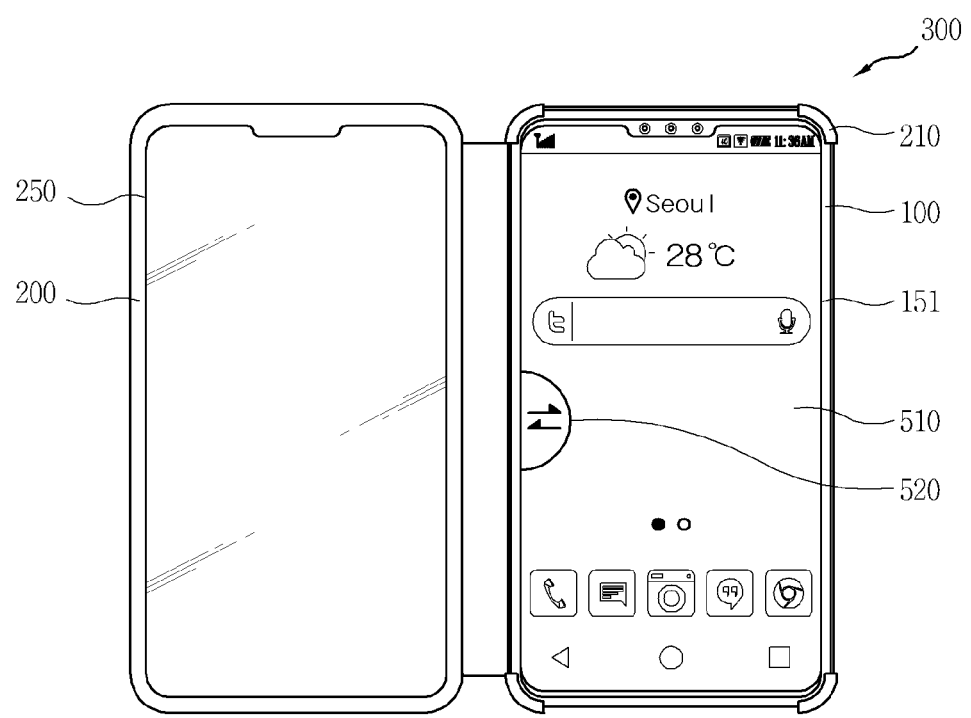
FIGS. 5A to 5H are conceptual diagrams for describing various embodiments of a method of controlling screens of a plurality of displays using a first display provided on the mobile terminal side in the electronic device according to the present disclosure.

In FIG. 5A, the first display 151 provided in the mobile terminal 100 is in the activated state, and the second display 250 provided in the case 200 is in the inactivated state.

In one example, in a case where the electronic device 300 switches from the closed state to the open state, the first display 151 is in the activated state, and for example, a home screen 510 is output.

In a case where the electronic device 300 switches from the closed state to the open state, the electric current for operation is supplied to the second display 250, but the inactivated state is maintained until an input is applied. The input here is an input that wakes up the second display 250, and for example, is a touch input (for example, a tap or a double tap, which is hereinafter referred to as a "knocking function") that is applied to the second display 250.

When the touch input is applied to the second display 250, a touch signal that corresponds to the touch input is transferred to the first wireless communication unit 116 through the second wireless communication unit 283 (FIG. 4). Then, the controller 180 of the mobile terminal determines whether or not the touch signal received through the first wireless communication unit corresponds to a predetermined-type touch. In a case where a result of the determination is that the touch signal is a signal that corresponds to the predetermined-type touch (for example, the tap or the double tap), a control signal that causes the second display 250 to switch to the activated state is generated and is transferred to the second display 250 through the first wireless communication unit 116 and the second wireless communication unit 283.

On the other hand, in another example, in a case where the electronic device 300 switches from the closed state to the open state, both the first display 151 and the second display 250 are in the activated state. In this case, for example, a first home screen is output on the first display 151, and a second home screen different from the first home screen, or a given screen is output on the second display 250.

On the other hand, an icon 520 indicating that a menu associated with control of the second display 250 is hidden is displayed on one area, for example, an edge area, of the home screen 510 that is output on the first display 151. A position of the icon 520 may be moved through a drag touch input, and the always-displaying of the icon 520 on the second display 250 may be limited.

The controller of the mobile terminal 100 displays the hidden menu on the first display 151, based on the touch input applied to the displayed icon 520. A symbol ˆ(−>) indicating a direction of dragging the touch input for displaying the hidden menu is displayed on the icon 520.

Figure 5B:
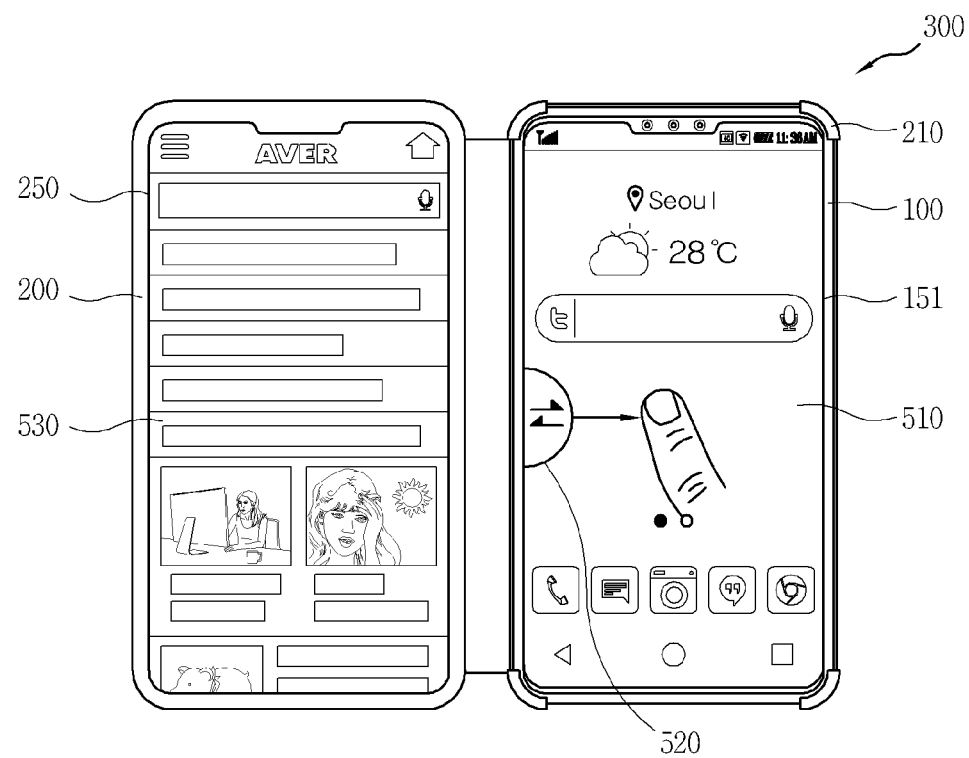
Figure 5B:
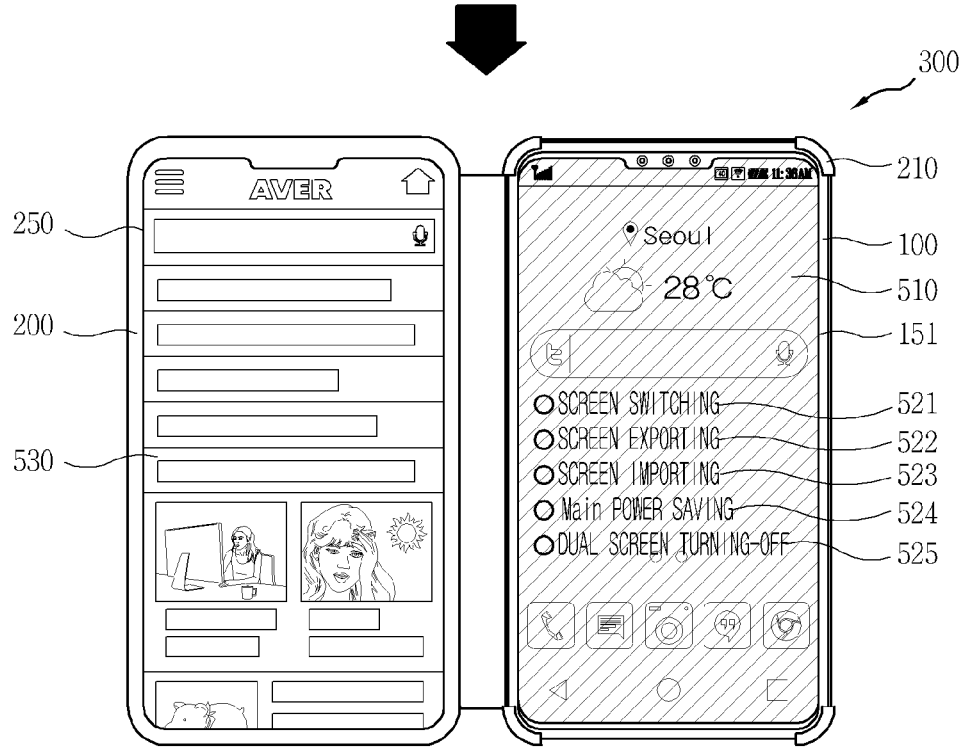

For example, as illustrated in FIG. 5B, in a state where the home screen 510 is output on the first display 151 and an execution screen 530 for a web application is output on the second display 250, when the touch input applied to the icon 520 on the home screen 510 is dragged from the edge area toward the center of the first display 151, hidden menus are displayed.

The displayed menus provide various functions for controlling the first display 151 and the second display 250 in conjunction with each other, based on an input to the first display 151. For example, as illustrated in FIG. 5B, a screen switching menu 521, a screen exporting menu 522, a screen importing menu 523, a main-screen power-saving menu 524, and a dual-screen turning-off menu 525 are provided. However, no limitation is imposed to the illustrated examples, and more different menus may be displayed.

FIGS. 5C to 5F specifically illustrate various functions for controlling the first display 151 and the second display 250 in conjunction with each other based on the touch input to the menu displayed on the first display 151.

Figure 5C:
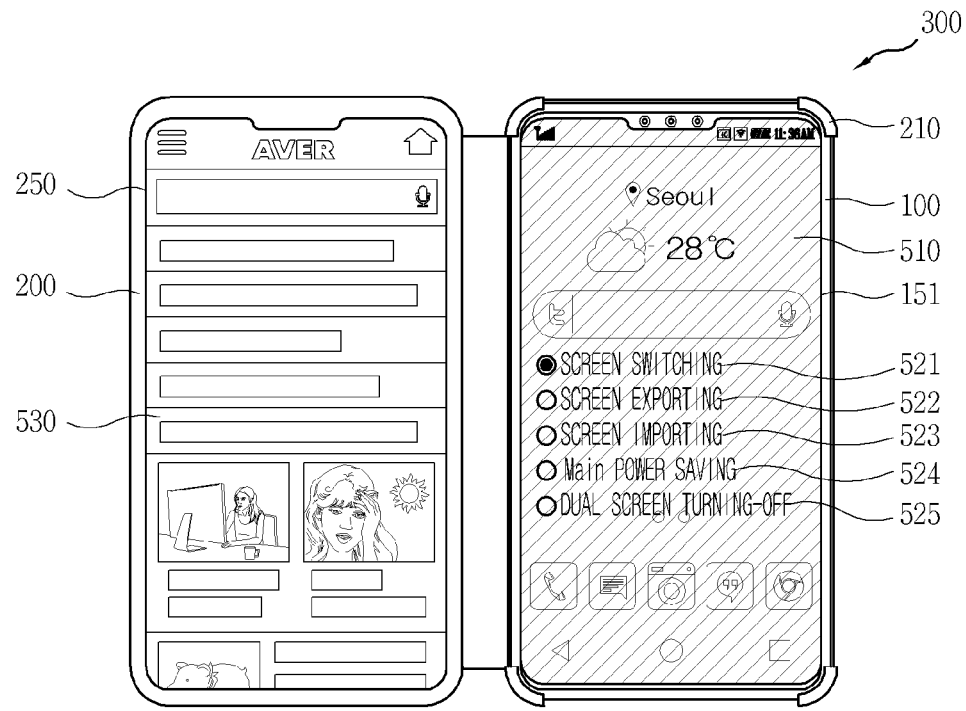
Figure 5C:
Figure 5C:
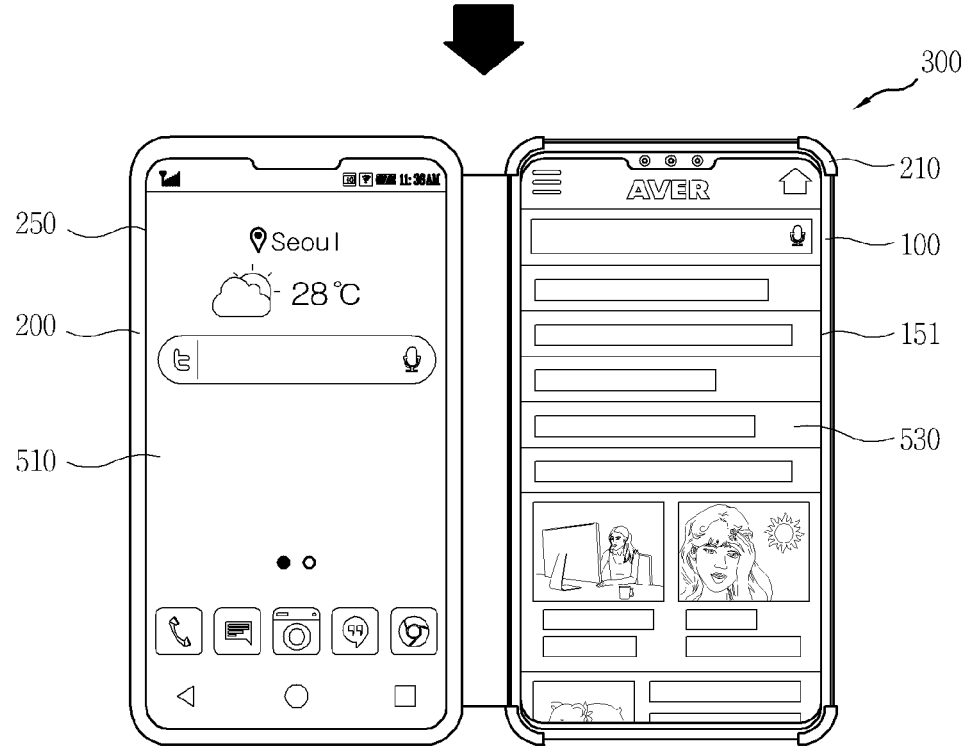

In FIG. 5C, the following operation corresponds to exchange between a screen displayed on the first display 151 and a screen displayed in the second display 250.

With reference to FIG. 5C, first screen information, for example, the home screen 510, is output on the first display 151, and second screen information, for example, the execution screen 530 for the web application, is output on the second display 250.

In this manner, in a state where different pieces of screen information are output on the first display 151 and the second display 250, respectively, when the touch input is applied to the screen switching menu 521 among the menus displayed on the first display 151, the home screen 510 that is being output on the first display 151 is moved to the second display 250. Along with this, the execution screen 530 that is being output on the second display 250 is moved to the first display 151.

To this end, the controller of the mobile terminal 100 moves a task that corresponds to the home screen 510 which is being output on the first display 151, to a memory stack allocated for the second display 250. In addition, the controller of the mobile terminal 100 moves a task that corresponds to the execution screen 530 which is being output on the second display 250, to a memory stack for the first display 151.

In this manner, after the first display 151 and the second display 250 exchange screens, when an input for displaying back the hidden menu is performed and the screen switching menu 521 is selected, restoring-back to an original screen state takes place.

To this end, the controller of the mobile terminal 100 moves the latest-input task from the memory stack allocated for the second display 250, back to the memory stack for the first display 151. At the same time, the controller of the mobile terminal 100 moves the latest-input task from the memory stack for the first display 151 to the memory stack allocated for the second display 250.

On the other hand, although not illustrated, in a case where the screen exporting menu 522 is selected from the first display 151, only a screen that is being output on the first display 151 is moved to the second display 250.

To this end, the controller of the mobile terminal 100 moves a task that corresponds to a screen which is being output on the first display 151, to the memory stack allocated for the second display 250. At this time, a screen that corresponds to the next task in the memory stack for the first display 151 is output on the first display 151. At this time, if the next task is not present, the home screen is output.

The screen importing menu 523 on the first display 151 is activated in a case where the second display 250 is in the activated state and where at least the screen exporting menu 522 was executed.

In a state where this condition is satisfied, when the screen importing menu 523 is selected, a screen that is displayed on the second display 250, which was output on the first display 151, is displayed back on the first display 151. Then, a screen that was output on the second display 250 before a screen displayed on the first display 151 appears on the second display 250 appears back on the second display 250.

To this end, the controller of the mobile terminal 100 moves a task that corresponds to the screen which is to be output on the second display 151, to the memory stack for the first display 250.

Figure 5D:
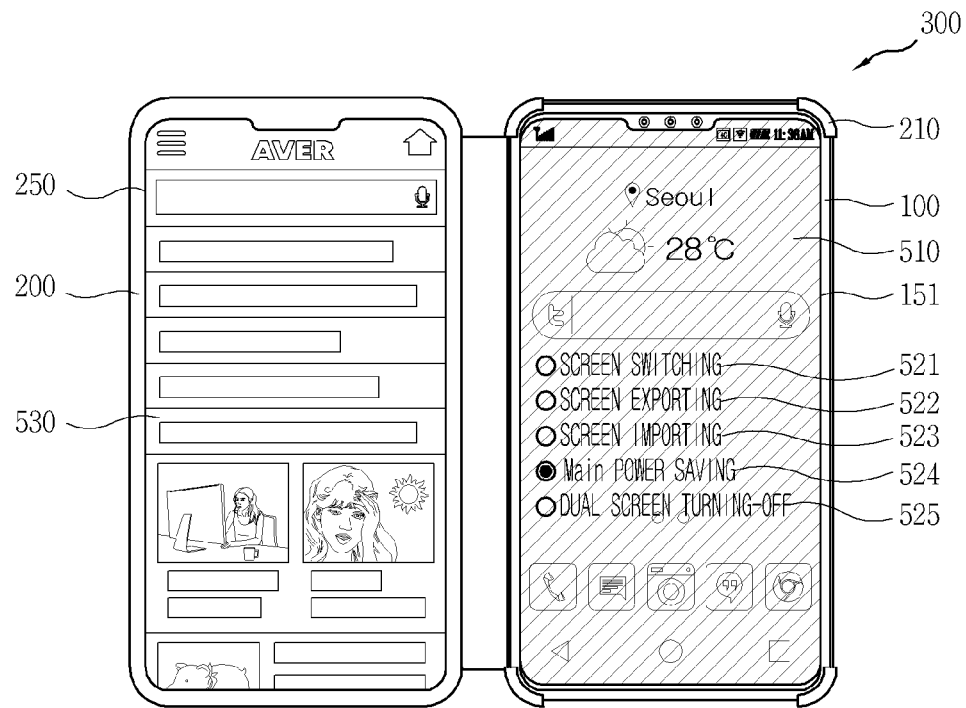
Figure 5D:
Figure 5D:
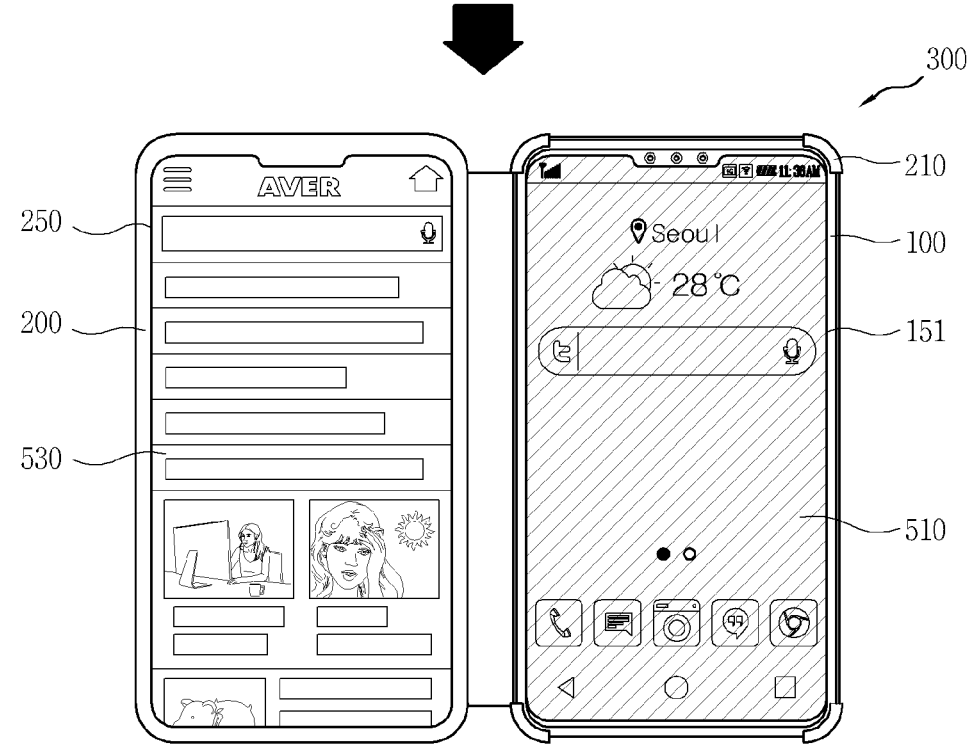

In FIG. 5D, the following operation corresponds to a function of switching only the screen displayed on the first display 151 to a power-saving mode.

When a touch input is applied to the main-screen power-saving menu 524, among the menus displayed on the first display 151, a control signal that corresponds to a touch signal which corresponds to the menu is generated, and the power-saving mode for the first display 151 is enabled.

At this time, the power-saving mode for only the first display 151 is enabled. Thus, an image signal that corresponds to screen information that is output on the second display 250 is transferred from the mobile terminal 100 to the second display 250 through the first and second wireless communication units 116 and 283.

The power-saving mode for the first display 151 is enabled, and thus, as illustrated in FIG. 5D, screen brightness of the home screen 510 on the first display 151 is adjusted to be low. On the other hand, the screen brightness of the execution screen 530 on the second display 250 is maintained to its previous level.

Figure 5E:
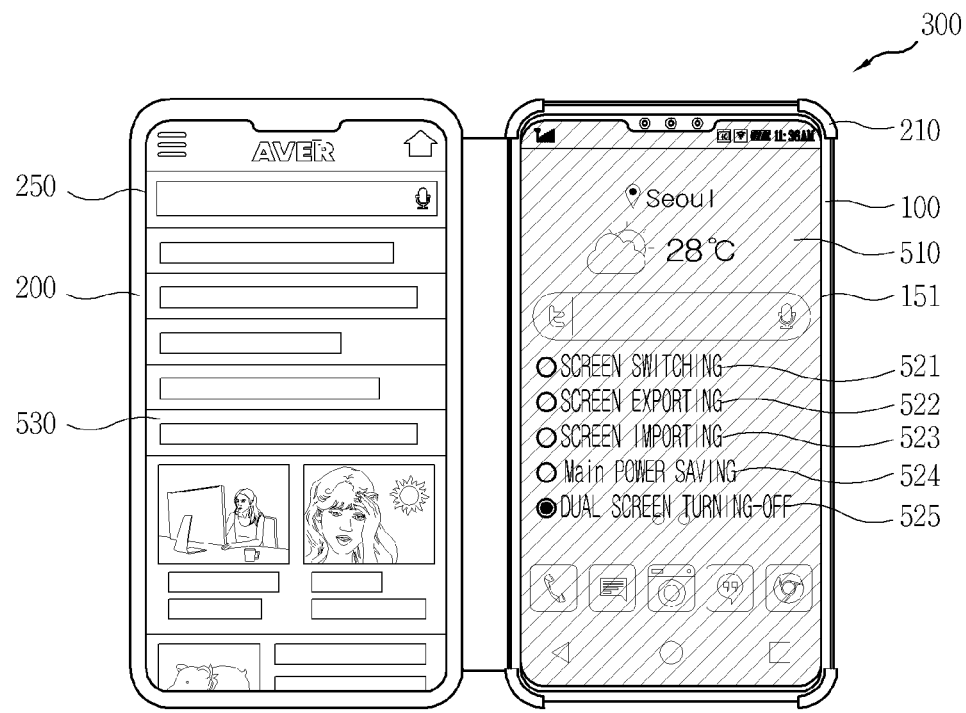
Figure 5E:
Figure 5E:
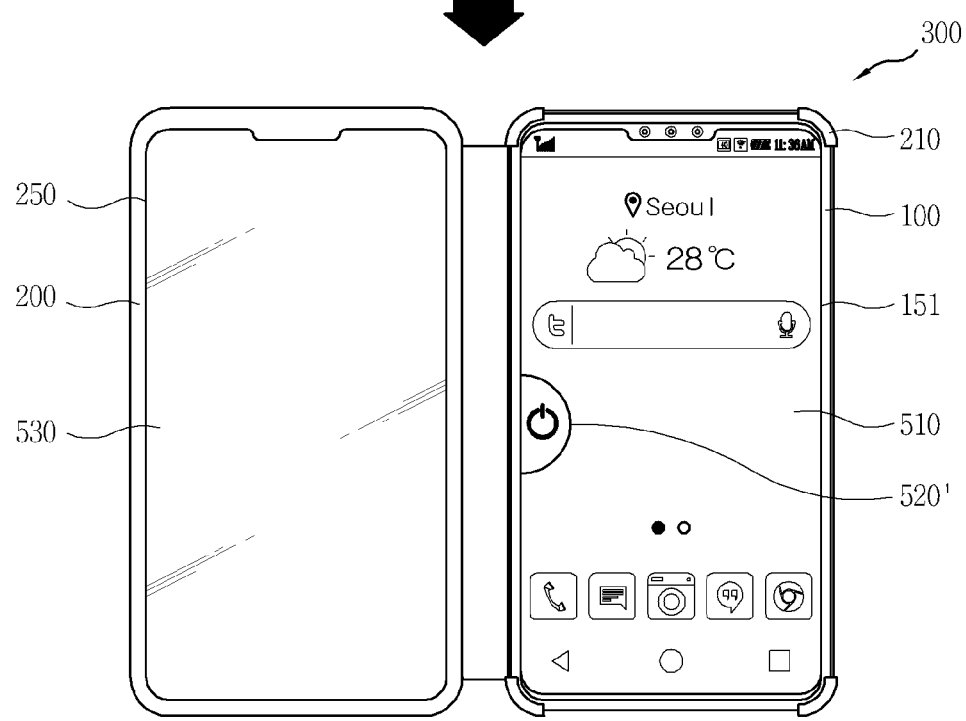
Figure 5F:
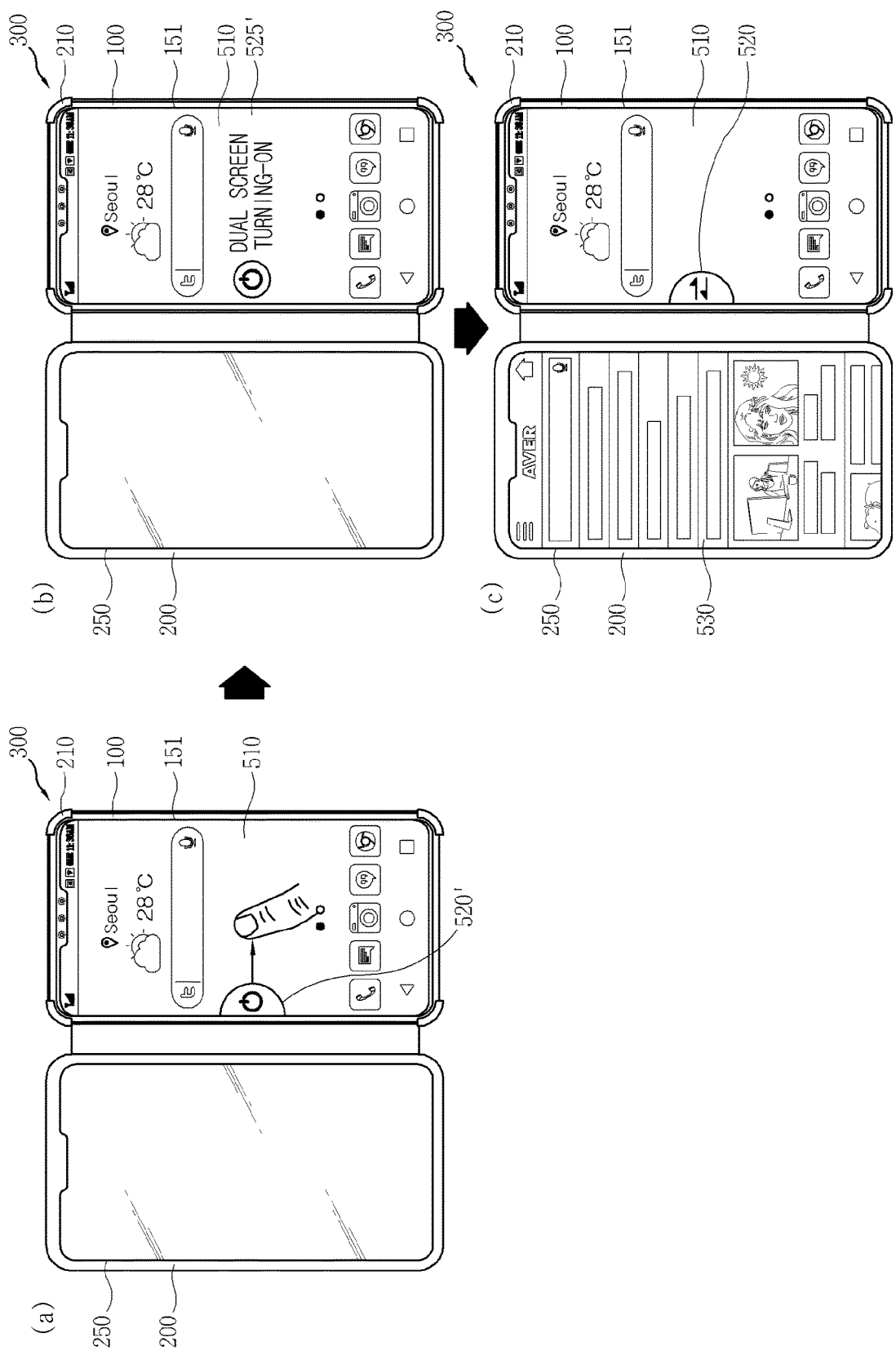

In FIGS. 5E and 5F, the following operation corresponds to a function of controlling power-on and -off of the second display 250 using a touch input to the first display 151.

First, with reference to FIG. 5E, when the dual-screen turning-off menu 525 displayed on the first display 151 is selected, the controller 180 of the mobile terminal transfers a control signal for causing the second display 250 to switch to the inactivated state, to the second display 250 through a first wireless communication unit 166 and a second wireless communication unit 283. Accordingly, as illustrated in the lower portion of FIG. 5E, the second display 250 switches to the inactivated state.

Then, switching from an icon (hereinafter referred to as "first icon") 520, which indicates that a hidden menu which was displayed on the first display 151 is present, to an icon (hereinafter referred to as "second icon") 520', which indicates a locked state, takes place for display.

In this manner, based on the input to the first display 151, the second display 250 switches to the inactivated state. Thus, the supply of the electric current for operation, which is supplied from the mobile terminal 100 to the second display 250 through a wiring line provided on the case 200, is interrupted.

However, in a case where a memory stack for the screen information that was output on the second display 250 is allocated for the mobile terminal 100, the mobile terminal 100 recognizes a task that corresponds to the screen information which was output on the second display 250.

In this manner, after the selection of the dual-screen turning-off menu 525, as illustrated in FIG. 5F, when a touch input applied to the second icon 520' is dragged in a given direction, for example, from the edge area of the first display 151 toward the center thereof, only a dual-screen turning-on menu 525' is displayed.

When a touch input is applied to the dual-screen turning-off menu 525', the controller 180 of the mobile terminal transfers a control signal for causing the second display 250 to switch to the activated state, to the second display 250 through the first wireless communication unit 166 and the second wireless communication unit 283. Then, the electric current for operation is supplied from the mobile terminal 100 back to the second display 250.

At this time, the screen information 530, which was output immediately before the second display 250 is in the inactivated state, is output back on the second display 250. To this end, the controller 180 of the mobile terminal performs control such that states of tasks in the memory stack allocated for the second display 250 are maintained. In another example, unlike in FIG. 5F, the home screen may be displayed on the second display 250 that switches to the activated state.

In this manner, when the second display 250 is in a turned-on state, switching from the second icon 520', which was displayed on the first display 151, to the 1 first icon 520, which indicates that a hidden menu is present, takes place for display.

On the other hand, using a predetermined touch gesture instead of the icon 520, a first screen displayed on the first display 151 may be sent to the second display 250, or a second screen displayed on the second display 250 may be sent to the first display 151. The predetermined touch gesture here may be a multi-finger touch gesture.

Figure 5G:
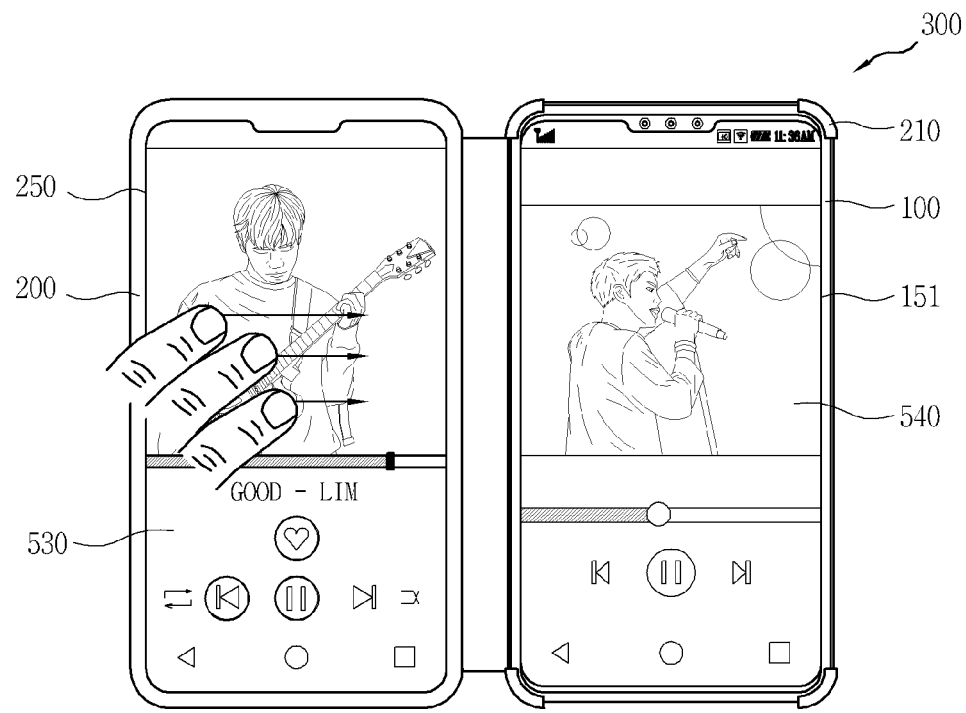
Figure 5G:
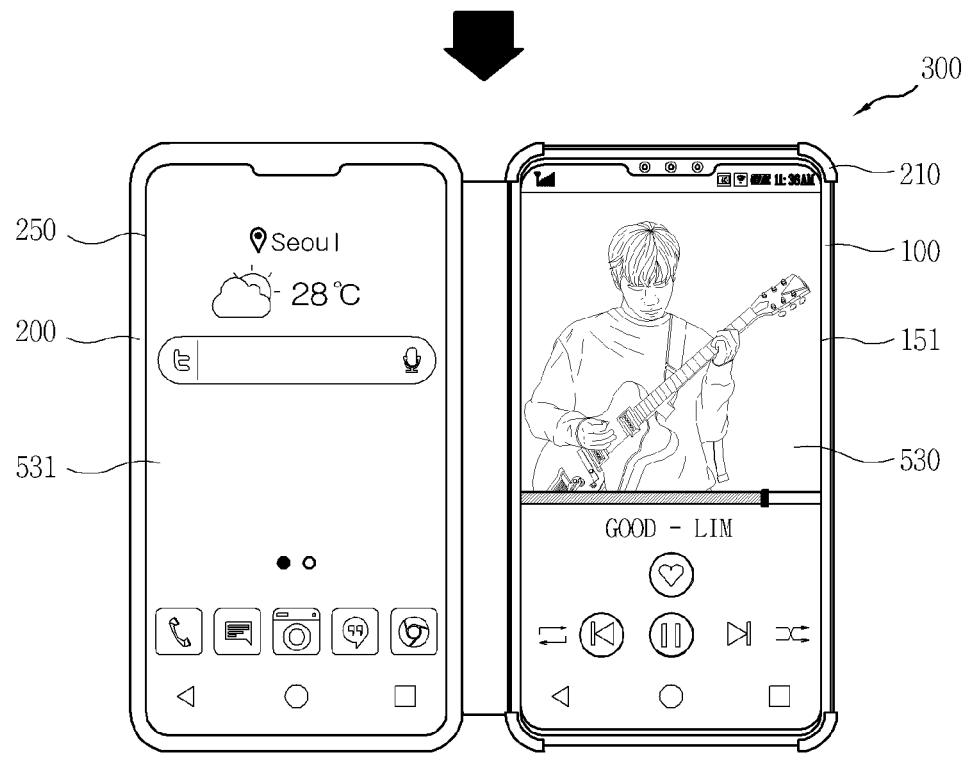

For example, as illustrated in FIG. 5G, in a state where first screen information 540 is displayed on the first display 151, and where second screen information 530 is displayed on the second display 250, when a three-finger touch gesture applied to the second display 250 is dragged toward the first display 151, the second screen information 530 displayed on the second display 250 is sent to the first display 151. In other words, a task in the memory stack allocated for the second display 250 is moved to the memory stack of the first display 151.

Accordingly, an application that corresponds to the first screen information 540 displayed on the first display 151 is positioned in the background, and the second screen information 530 is displayed on the first display 151. Then, a screen for the application that was being executed in the background, or the home screen is displayed on the second display 250.

Figure 5H:
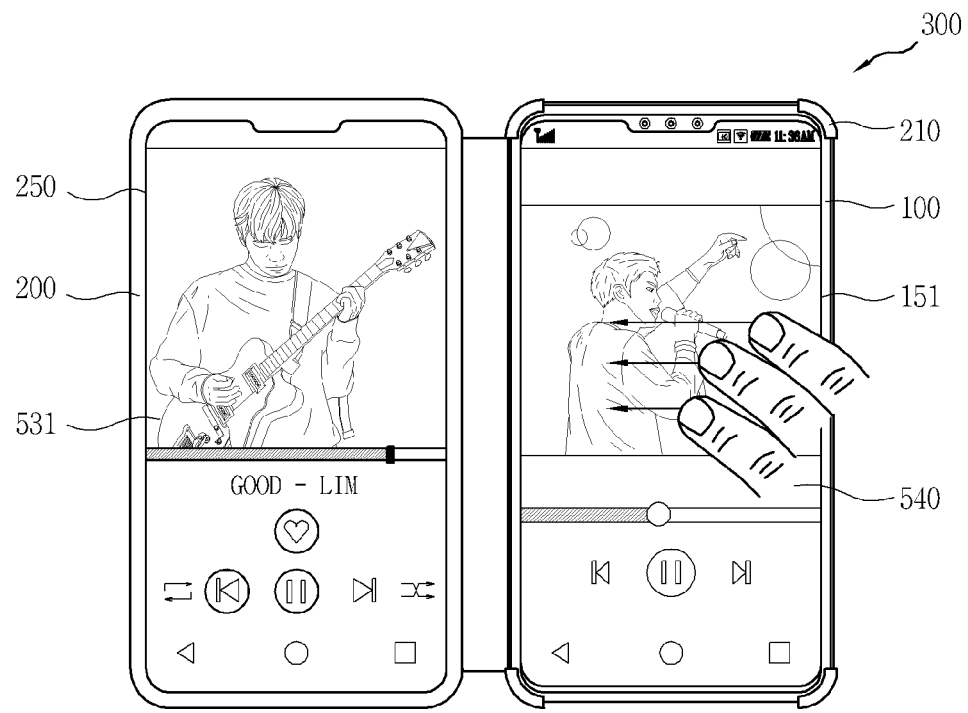
Figure 5H:
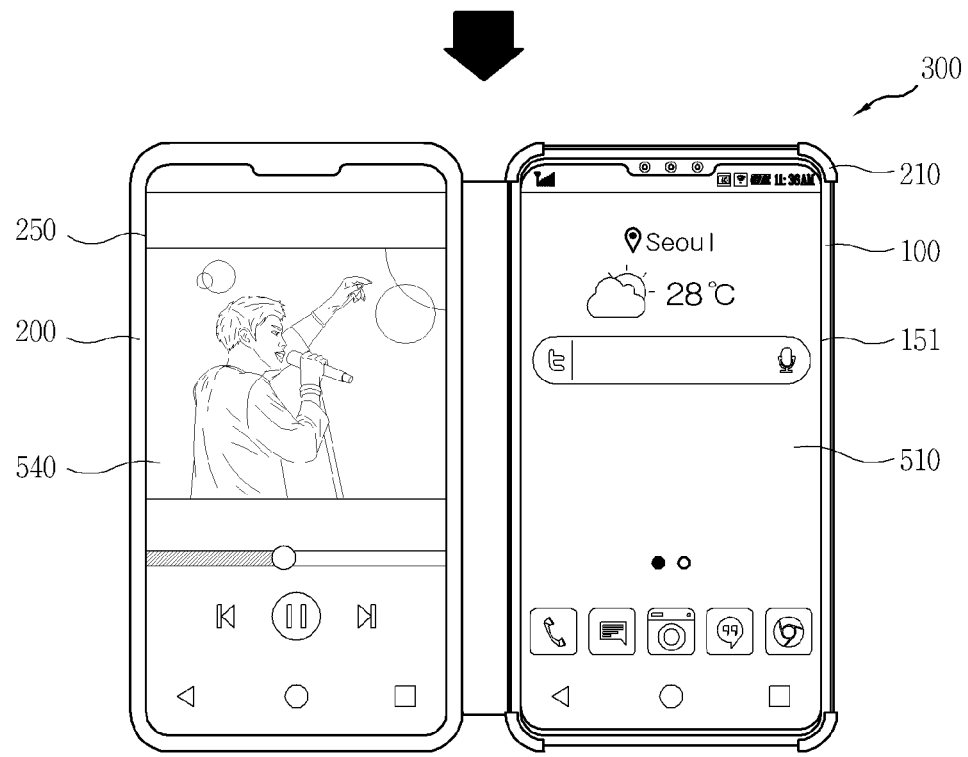

Similarly, as illustrated in FIG. 5H, in a state where the first screen information 540 is displayed on the first display 151 and where the second screen information 530 is displayed on the second display 250, when a three-finger touch gesture applied to the first display 151 is dragged toward the second display 250, the first screen information 540 displayed on the first display 151 is sent to the second display 250. In this case, a task in the memory stack of the first display 151 is moved to the memory stack allocated for the second display 250.

Accordingly, an application that corresponds to the 2first screen information 530 displayed on the 2first display 250 is positioned in the background, and the 1 second screen information 530 is displayed on the 2first display 250. Then, the screen for the application that was being executed in the background, or the home screen is displayed on the 1 second display 151.

In this manner, the electronic device 300 according to the present disclosure provides both a plurality of independent display functions and an expanded display function, whenever necessary, using the first display 151 provided in the combined mobile terminal 100 and the second display 250 provided in the case, which is controlled by the mobile terminal 100. All of these functions are hereinafter collectively referred to as "expanded display conjunction function."

Specifically, according to the present disclosure, using the plurality of independent display functions, it is possible that message inputting is performed and that at the same time, information to be shared is searched for. Then, in order to share a result of the search, the result of the search can be shared immediately using an expanded display area.

To this end, according to the present disclosure, an independent memory stack is allocated for the second display 250, but control of the memory stack allocated for the second display 250 is performed through the mobile terminal.

In a state where the first screen information including an input area is displayed on the first display 151 and where the second screen information is displayed on the second display 250, in response to reception of a touch input in the input area, the controller 180 of the mobile terminal according to the present disclosure controls the first wireless communication unit, the second wireless communication unit, the first display 151, and the second display 250, such that the second screen information displayed on the second display 250 is captured and that the captured second screen information is inserted into the input area of the first screen information.

In the present specification, the first wireless communication unit is provided on the mobile terminal side, and the second wireless communication unit is provided on the case side. The first and second wireless communication units are electrically coupled to the circuit board and the power supply unit through the wiring unit.

Figure 6:
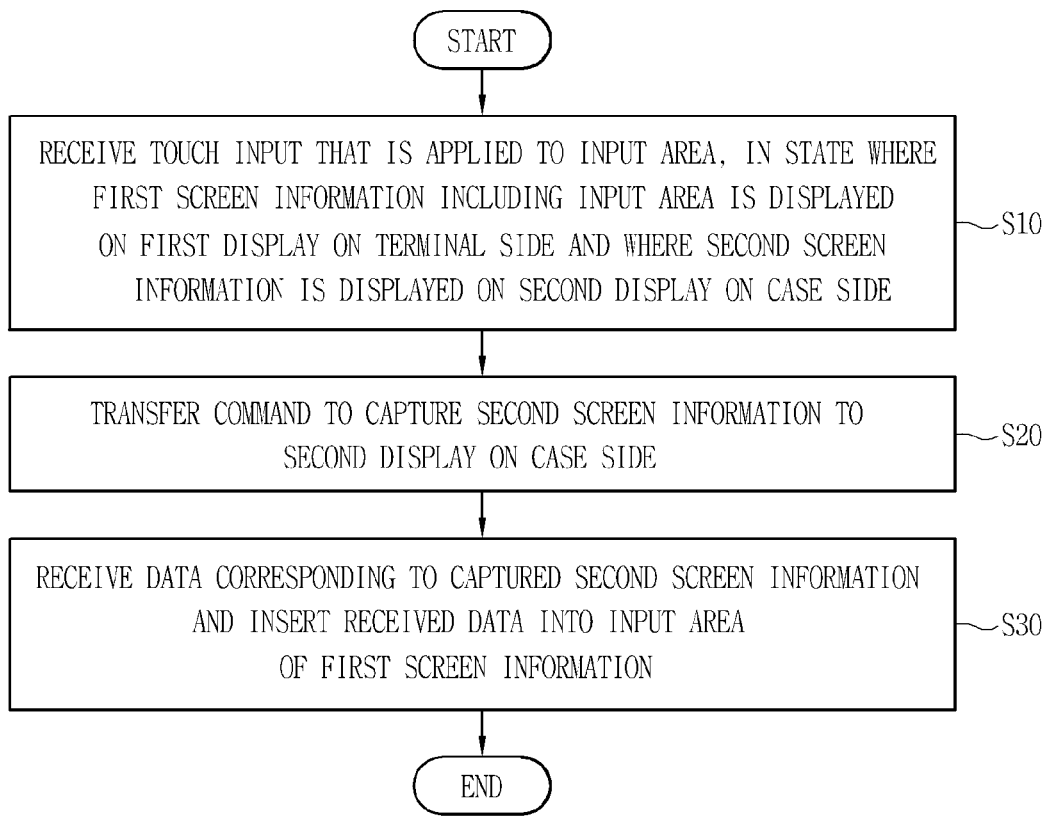
FIG. 6 is a typical flowchart for describing steps of a method of operating the electronic device according to the present disclosure.

With reference to FIG. 6, a method in which a screen that is currently being viewed is shared in an easier and faster manner using the expanded display conjunction function will be described in detail below.

First, if it is detected that the electronic device according to the present disclosure switches from the closed state to the open state, the first display 151 and the second display 250 are both activated, or only the first display 151 is in the activated state. In the latter case, when a touch signal that corresponds to a touch input applied to the second display 250 is transferred to the controller of the mobile terminal, a control signal for causing the second display 250 to switch to the activated state is generated. The generated control signal is transferred to the second display 250 through the first wireless communication unit 116 on the mobile terminal 100 side and through the second wireless communication unit 283 on the case 200 side. Then, the electric current for operation is supplied by the controller of the mobile terminal 100 to the second display 250.

In this manner, when the first display 151 and the second display 250 are both activated, different pieces of screen information that correspond to execution of different applications, respectively, are output on the first display 151 and the second display 250, respectively.

With reference to FIG. 6, the first screen information including the input area is displayed on the first display 151, and the second screen information different from the first screen information is displayed on the second display 250. In this state, the controller of the mobile terminal detects that a predetermined touch input is received in the input area displayed on the first display 151 (S10).

The first screen information here is limited to an execution screen for an application, which is used for display, storage, or transfer of information that is input through the input area. For example, the first screen information is a message screen or an SNS execution screen on which a keyboard area is output.

In addition, no special limitation is imposed on the second screen information here. For example, the second screen information may be the home screen, and may include all execution screens for specific applications (for example, a gallery application, an SNS application, a camera application, a web application, a map application, a moving image application, a financial application, and the like) that is different from the first screen information.

On the other hand, in one example, the first screen information may be limited to an execution screen for an application, which includes the input area and through which image attachment is possible. In addition, the second screen information may be limited to a screen capturable and for example, a screen (for example, a security screen, a ticket purchase screen, or the like) that is uncapturable for the purpose of security or identification may be excluded from the second screen information.

In addition, the input area here may be disposed at a lower end of the first screen information and may include at least a keyboard area. In addition to the keyboard area, the input area may further a tool area and a display area.

The keyboard area is formed to include a plurality of keys and to receive a key input that is applied to at least one of the plurality of keys. In addition, the tool area is formed to have a plurality of icons each of which changes a configuration of the keyboard area and provides an additional function associated with a key input. In addition, the display area is formed such that a result of the inputting that uses the keyboard area or the tool area is displayed on the display area.

A predetermined touch input that is applied to the input area means a touch input applied to an icon included in the tool area. However, no limitation is imposed to this. The predetermined touch input may be a predetermined touch gesture (for example, a specific pattern/a touch gesture in a given shape) that is received in the keyboard area and/or the tool area.

In this manner, when the predetermined touch input is received in the input area displayed on the first display 151, the controller 180 of the mobile terminal generates a control signal (hereinafter referred to as "first control signal") that captures the second screen information that is output on the second display 250. The controller of the mobile terminal transfers the first control signal to the second display 250 on the case 200 side through the first wireless communication unit 116 and the second wireless communication unit 283 (S20).

According to the first control signal, when the second screen information that is currently being output on the second display 250 is captured, data corresponding to the captured second screen information is transferred to the controller 180 of the mobile terminal through the second wireless communication unit 283 and the first wireless communication unit 116.

In response to reception of the data corresponding to the captured second screen information, the controller 180 of the mobile terminal generates a control signal (hereinafter referred to as "second control signal") for inserting an image (for example, a thumbnail image) corresponding to the captured second screen information into the input area of the first display 151. According to the second control signal, the image corresponding to the captured second screen information is inserted into the input area of the first display 151 (S30).

Through a predetermined-type touch (for example, a touch on a "transfer icon"), the image inserted into the input area is immediately displayed on the first screen information and, for sharing, is transferred to the other party, a terminal that participates in conversation. On the other hand, the captured second screen information is stored in a memory 170 of the mobile terminal 100 or a memory 270 on the case 200 side.

In the related art, while message conversation is in progress, only an already-stored image is searched for and is attached. In addition, because a keyboard area for message inputting is used for searching for the already-stored image, the message inputting is interrupted, and only image search through a small-sized screen is possible. Furthermore, in order to attach an image that is not stored, a message conversation screen is interrupted, a different application is executed, and desired information is searched for. Thereafter, capture or storing is performed, and then various steps of selecting an application to be shared or switching to a previous message conversation screen have to be performed.

However, by performing the expanded display conjunction function according to the embodiment of the present disclosure, which is described above, without going through various steps, an image displayed through a different display area is captured immediately and is inserted as message contents. Accordingly, it is possible that, with one-time inputting, information displayed on a different screen is shared immediately with the other conversation party while an input area of the message conversation screen is maintained as is.

Each step in FIG. 6, which is described above, will be described in more detail below with reference to FIGS. 7A and 7B.

Figure 7A:
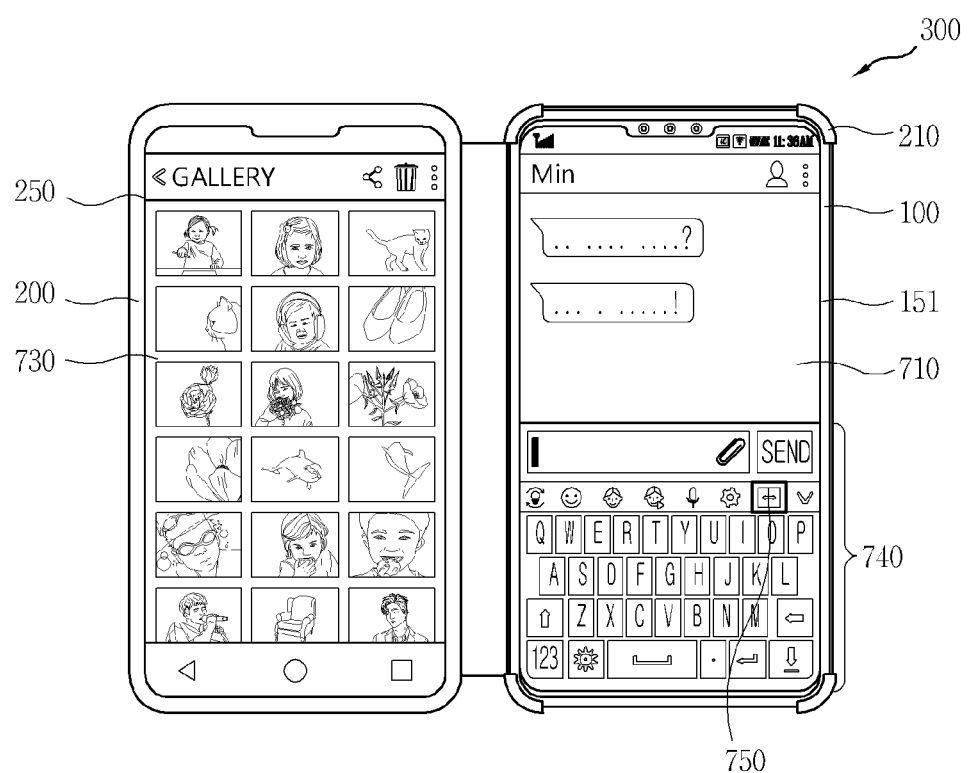
FIGS. 7A and 7B are diagrams illustrating the operation method in FIG. 6.

With reference to FIG. 7A, a message conversation screen 710 that results from execution of a message application is displayed on the first display 151 of the electronic device 300. Then, a thumbnail list screen 730 that results from execution of the gallery application is displayed on the second display 250 disposed on the case side of the electronic device 300.

The second display 250 is controlled by the controller 180 of the mobile terminal 100 and is supplied with the electric current for operation from the mobile terminal 100. However, a separate memory stack for the second display 250 is already allocated, and thus, as described above, it is possible that the second display 250 is used independently of the first display 151.

An input area 740 for message inputting is output on the message conversation screen 710 displayed on the first display 151. The input area 740 is not always output. Based on a user input, the input area 740 may be output on a large-sized screen or may disappear from the large-sized screen.

An icon 750 for performing capture and insertion (capture or paste) of an image displayed on the second display 250 is displayed on the input area 740.

Although not illustrated, when a proximity touch on the icon 750 is detected, the controller of the mobile terminal controls the first display 151 such that guidance information indicating a function to be performed pops up. Accordingly, a user can recognize a function corresponding to the icon 750.

According to a display state of the second display 250, the controller of the mobile terminal 100 determines differently whether or not the icon 750 included in the input area 740 is activated.

Specifically, when the second display 250 is in the inactivated state, the icon 750 displayed on the input area 740 of the first display 151 is displayed in the inactivated state. The displaying of the icon 750 here in the inactivated state means that dotted-line marking, blurring, or a dimming effect is applied to the icon 750 in a manner that is visually distinguished from a different icon in the activated state. In a case where an input is applied to the icon 750 displayed in the inactivated state, no operation is performed.

In another example, even in a case where the second display 250 is in the inactivated, the icon 750 may be displayed in the activated state. In this case, in response to the application of the touch input to the icon 750, the second display 250 switches to the activated state (that is, the screen increases in size), and the home screen or given screen information is displayed. Subsequently, capture is performed. To this end, according to the touch signal that corresponds to the touch input applied to the icon 750, the controller 180 of the mobile terminal 100 supplies the electric current for operation to the second display 250, and transfers the first control signal for capturing the subsequently-displayed image, as well as the control signal for causing the second display 250 to switch to the activated state, to the second display 250 through the first wireless communication unit 116 and the second wireless communication unit 283.

In addition, the controller of the mobile terminal 100 determines differently whether or not the icon 750 included in the input area 740 is activated, depending on a type of screen displayed on the second display 250 or a type of application that is being executed.

To this end, when the input area 740 is output on the first display 151, the controller 180 of the mobile terminal 100 determines whether or not the screen information displayed on the second display 250 is screen information capturable. For example, when the input area 740 is output, if the screen information displayed on the second display 250 is screen information uncapturable, the icon 750 included in the input area 740 is displayed in the inactivated state.

However, in this case, when it is also determined that switching from the screen information displayed on the second display 250 in response to the operation on the second display 250 to the screen information capturable takes place, the controller 180 may control the first display 151 such that the icon 750 included in the input area 740 switches to the activated state for displaying.

While the thumbnail list screen 730 capturable is displayed on the second display 250, when a touch input is applied to the icon 750 displayed on the input area 740 of the first display 151, the thumbnail list screen 730 is captured at a point in time when the touch input is applied.

Figure 7B:
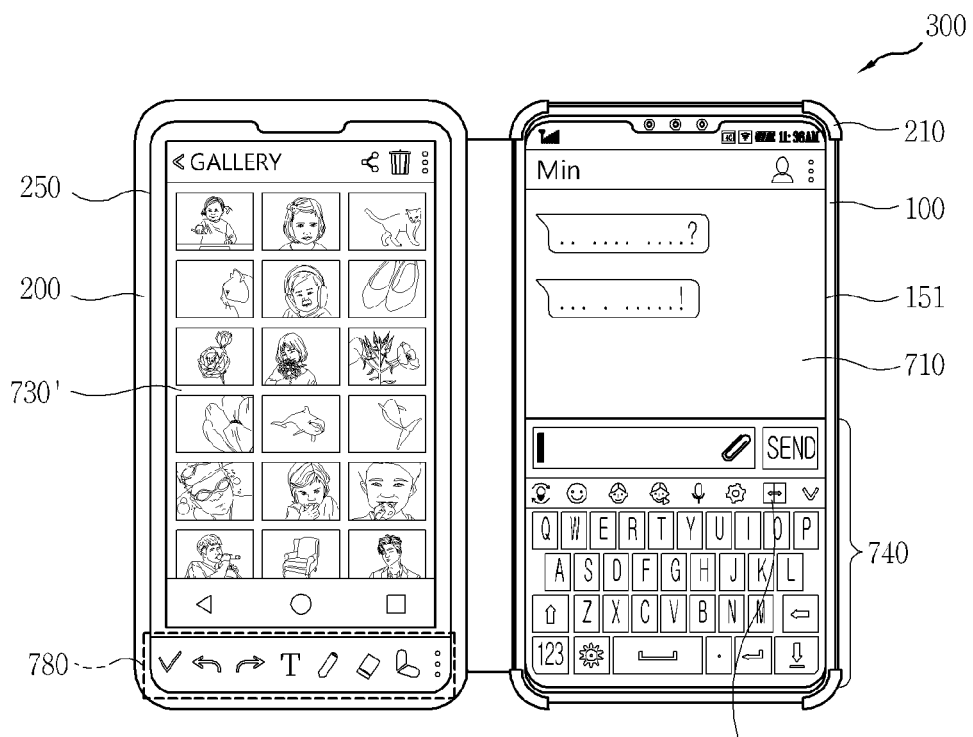
Figure 7B:
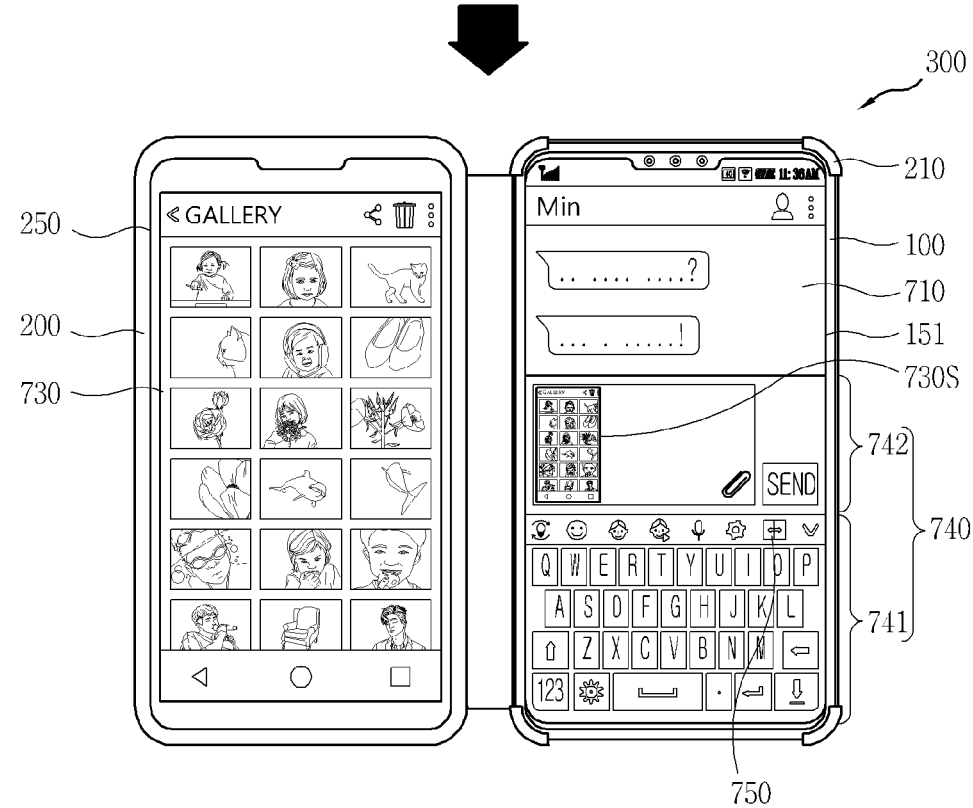

With reference to the upper portion of FIG. 7B, a captured image 730' of the thumbnail list screen 730 is output on the second display 250. At this time, a tool area 780 for performing editing of a captured image is displayed on the lower end of the captured image 730' for a predetermined time. In addition, the input area 740 of the first display 151 maintains its previous display state, and particularly, the keyboard area does not appear. At this time, a symbol for selection is displayed on the icon 750 displayed on the input area 740.

Subsequently, after a predetermined time (for example, 0.5 to 1.5 seconds) elapsed, the captured image 730' displayed on the second display 250 is inserted into the input area 740 of the first display 151.

From the lower portion of the FIG. 7B, it is seen that the captured image 730' is displayed on a display area 742 of the input area 740 of the first display 151. At this time, the captured image 730' is displayed, as a thumbnail 730S, on the display area 742. Along with this, the captured image 730' on the second display 250 returns to the previous screen, that is, a gallery thumbnail list screen 730. That is, when the user touches on a "transfer icon" within the display area 742, the inserted image 730S is immediately transferred and shared.

An operation within the mobile terminal 100, which is one for capturing or pasting at one time the screen information that is output on the second display 250, based on the touch input to the first display 151, is as follows.

When the input area of the first display 151 is output, the controller 180 of the mobile terminal 100 determines the display state of the second display 250 and whether or not the screen information that is being output is capturable. When a result of the determination is that the screen information that is output on the second display 250 is a screen capturable, a capture and paste icon included in the input area is displayed in the activated state. On the other hand, when the result of the determination is that the screen information that is output on the second display 250 is a screen uncapturable (for example, a screen including unique identification information, such as a security screen or a ticket purchase screen), the first display 151 is controlled such that the capture and insertion icon included in the input area is displayed in the inactivated state.

In addition, the controller 180 of the mobile terminal 100 detects that a predetermined touch input is applied to the input area of the first display 151, for example, a touch is applied to the capture and insertion icon, and recognizes that the touch signal that corresponds to the detected touch input is one that results from a touch input for paste and insertion. At a point in time when the touch input is applied, that is, at a point in time when the touch signal is received, the controller 180 transfers the first control signal for capturing the screen information displayed on the second display 250, to the second display 250 through the first wireless communication unit 116 and then the second wireless communication unit 283.

According to the first control signal, under the control of the controller 280, the second display 250 performs capture of the screen information that is currently being displayed. Then, data associated with the captured image is transferred to the controller 180 of the mobile terminal 100 through the second wireless communication unit 283 and then the first wireless communication unit 116. Then, the controller 180 generates the second control signal for inserting the captured image corresponding to the received data into the input area of the first display 151, and provides the generated second control signal to the first display 151. According to the second control signal, the captured image is displayed on the input area of the first display 151. At this time, the latest-input task in the separately-allocated memory stack, that is, an original screen corresponding to the captured image is displayed on the second display 250.

In this manner, according to the present disclosure, only with one expanded display conjunction function, the screen information that is being output on a different screen is immediately shared as message contents while the message conversation is in progress. With the one-time touch input, the user can perform an operation that was performed through various steps. Furthermore, the display states of the keyboard area for message inputting and of the screen information that is being output on a different screen are maintained as before. Thus, the user convenience and the usability are further improved.

Figure 8A:
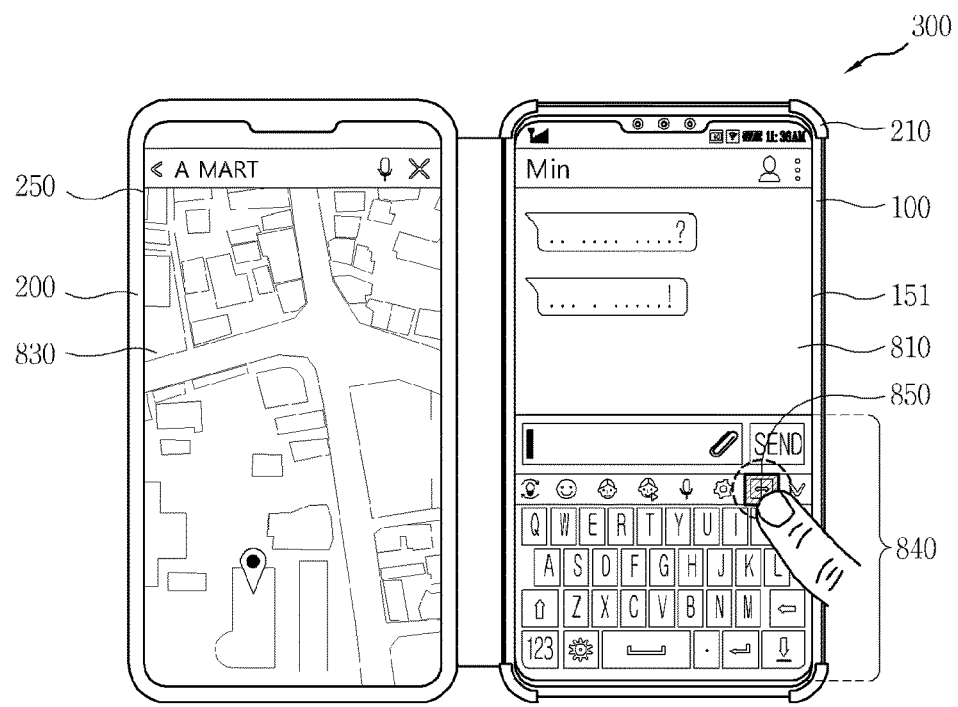
FIGS. 8A, 8B, and 8C are conceptual diagrams for describing a step in which a screen of a second display is captured, and then is edited and inserted in a first display, in the electronic device according to the present device.
Figure 8B:
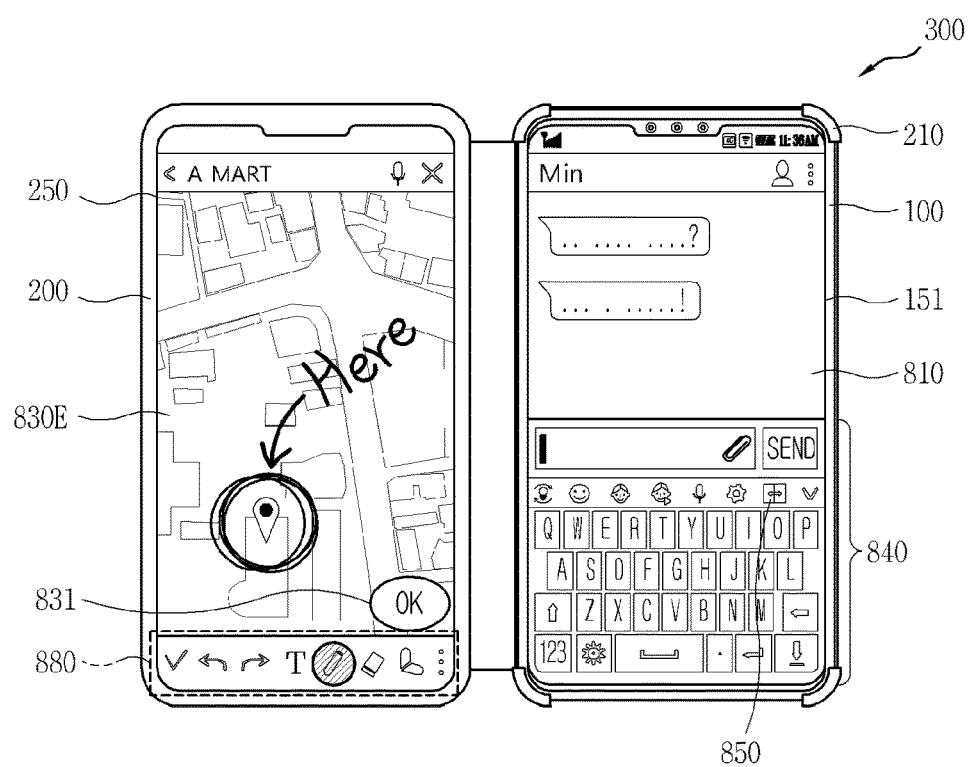
Figure 8C:
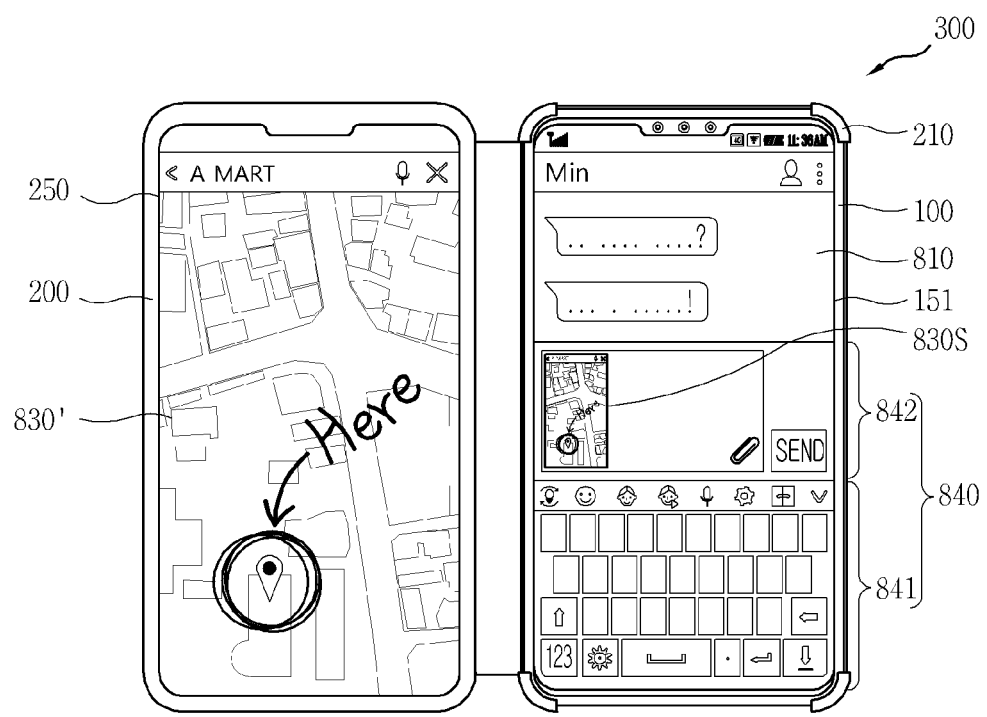

In FIGS. 8A to 8C, the following embodiments result from adding an operation of performing editing after the screen information displayed on the second display 250 is inserted and captured, but before it is inserted. In this case, the user convenience that an additional input for inserting is not requested after editing is also provided.

With reference to FIG. 8A, a message conversation screen 810 including an input area 840 is displayed, as the first screen information, on the first display 151. Then, pre-editing screen information for an image that is to be shared on the message conversation screen on the first display 151, for example, an execution screen 830 for a map application, is displayed, as the second screen information, on the second display 250.

In this state, when an input is applied to an icon 850 for performing capture and insertion, which is displayed on the input area 840 of the first display 151, the first control signal described above is transferred by the controller 180 to the second display 250. Accordingly, the execution screen 830 for the map application displayed on the second display 250 is captured, and the captured image is displayed on the second display 250 for a predetermined time.

While the captured image is displayed on the second display 250, that is, within a predetermined time after a touch is applied to the icon 850, when a touch input is applied to the captured image displayed on the second display 250, the captured image is not immediately inserted into the input area 840 of the first display 151, and an "editing mode" is enabled.

For example, within a predetermined time, when a touch input is applied to the "tool area" that is output on the lower portion of the captured image, the editing mode is enabled. In addition, after a fixed time elapsed, the tool area appears that is output on the lower portion of the captured image. At this time, the editing mode is no longer enabled, and the captured image, as is, is inserted into the first display 151. In this manner, when a predetermined time elapsed after the outputting of the captured image including the tool area, the captured image is inserted. This provides an editing opportunity to the user.

In the editing mode, as illustrated in FIG. 8B, an editing screen 830E for the captured image is displayed. The user can input additional information to the editing screen 830E using the tool area 880 displayed on the lower end of the editing screen 830E, and the touch input. Accordingly, as illustrated in FIG. 8B, the editing screen 830E into which additional information is input such that a destination is identified at a glance is generated in real time.

When a touch is applied to an editing completion icon 831 displayed on the editing screen 830E, the editing mode is disabled. Then, as illustrated in FIG. 8C, the editing screen 830E that is editing-completed is inserted into a display area 842 included in the input area 840 of the first display 151. Then, screen information that is present before the editing mode is enabled, is output on the second display 250.

The touch here, which is applied to the editing completion icon 831, generates a touch signal for disabling the editing mode. In this manner, when the touch signal for disabling the editing mode is generated, the second control signal for inserting the editing screen into the first display 151 is generated by the controller 180 of the mobile terminal 100.

To this end, once the controller 180 of the mobile terminal 100 receives data associated with the captured image displayed on the second display 250 through the second wireless communication unit 283 and the first wireless communication unit 116. Then, when a touch input is applied to the tool area at the lower end of the captured image displayed on the second display 250, the controller 180 of the mobile terminal 100 receives a touch signal that corresponds to the touch input, and puts the insertion of the captured image on hold. Then, the controller 180 transfers a processing signal associated with a drawing input corresponding to the touch gesture that is performed on the second display 250, to the second display 250 through the first wireless communication unit 116 and the second wireless communication unit 283, until an editing ending signal is received.

In addition, in response to the reception of the editing ending signal, the controller 180 inserts the editing screen that is editing-completed, to the input area of the first display 151. At this time, while the captured image is edited on the second display 250, image processing associated with the generation of the editing screen is performed through the controller 180 of the mobile terminal 100. Thus, when receiving the editing ending signal, the controller 180 recognizes the editing screen. Therefore, the touch input to an editing completion icon 830 does not correspond to an additional input for the insertion of the editing screen.

When the editing screen 830E is attached, as a thumbnail 830s, to the display area 842 within the input area 840 of the first display 151, the editing screen 830E that was displayed on the second display 250 is restored to the pre-capture screen, that is, the execution screen 830 for the map application. At this time, the editing screen 830E is stored, by the controller 180, in a memory of the mobile terminal, or the like.

On the other hand, in another embodiment, the editing may be performed before the capture and the insertion are performed. In this case, the editing work on the second display 250 is performed independently of the editing work on the first display 151. Thus, the user can alternately perform alternately or at the same time the editing work on the first display 151 and the editing on the second display 250.

In this manner, according to the present disclosure, using the expanded display conjunction function positively, with the one-time touch input, the capture and the insertion are performed while the message conversion is in progress. Additionally, quick editing of the captured image is performed after the capture but before the insertion, and thus additional information is inserted in an easier and faster manner.

On the other hand, all pieces of screen information displayed on the second display 250 are not captured for the insertion into the first display 151. To this end, the controller 180 of the mobile terminal 100 determines whether or not the screen information displayed on the second display 250 is a screen capturable. A point in time for this determination is a point in time when an input area 940, that is, the keyboard area, is output on the first display 151.

When the input area 940 is output on the first display 151, if it is determined that the screen information displayed on the second display 250 is a screen uncapturable, the controller 180 performs control such that an icon 950' for performing the capture and the insertion is displayed in the inactivated state.

On the other hand, in one example, while the input area 940 is displayed on the first display 151, when it is detected that switching from the screen information displayed on the second display 250 to the screen capturable takes place, the controller 180 switches the icon 950', which is displayed in the inactivated state, to the activated state.

Based on a type of the screen information 930 or a type of corresponding application, it is determined whether or not screen information 930 displayed on the second display 250 is a screen uncapturable. For example, it is determined that a financial application, a learning application, or a ticket purchase screen, a QR screen, or the like is a screen uncapturable. When the input area 940 is output on the first display 151, this determination is made by the controller 180 of the mobile terminal 100.

Figure 9A:
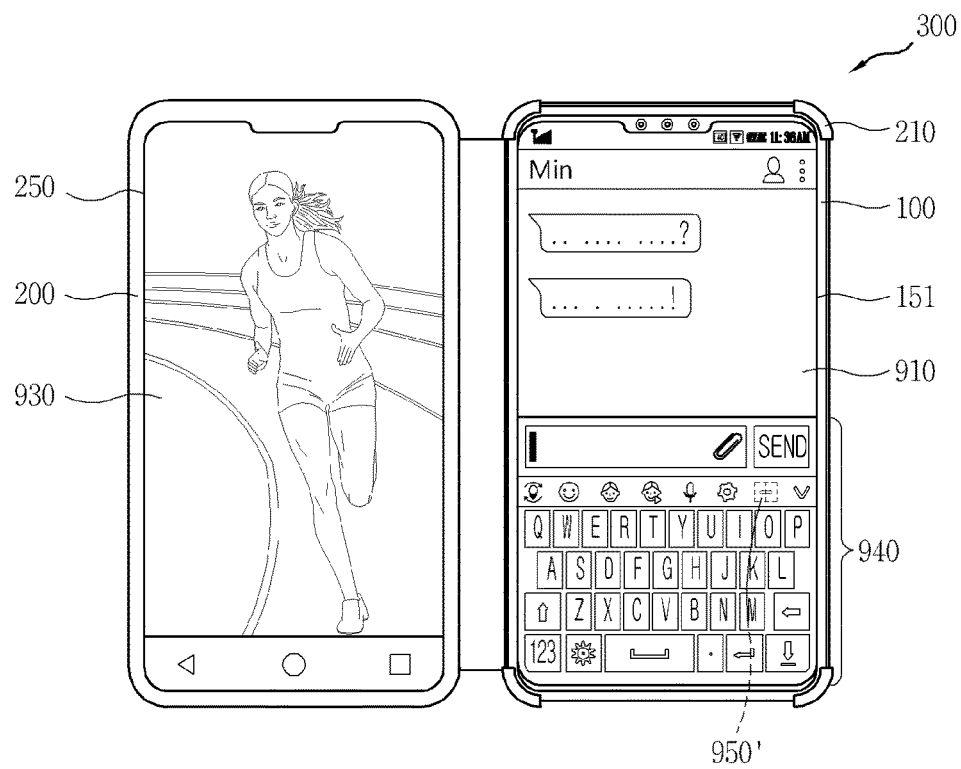
FIGS. 9A and 9B are exemplary conceptual diagrams for describing a processing operation in a case where the screen of the second display is uncapturable, in the electronic device according to the present disclosure.
Figure 9B:
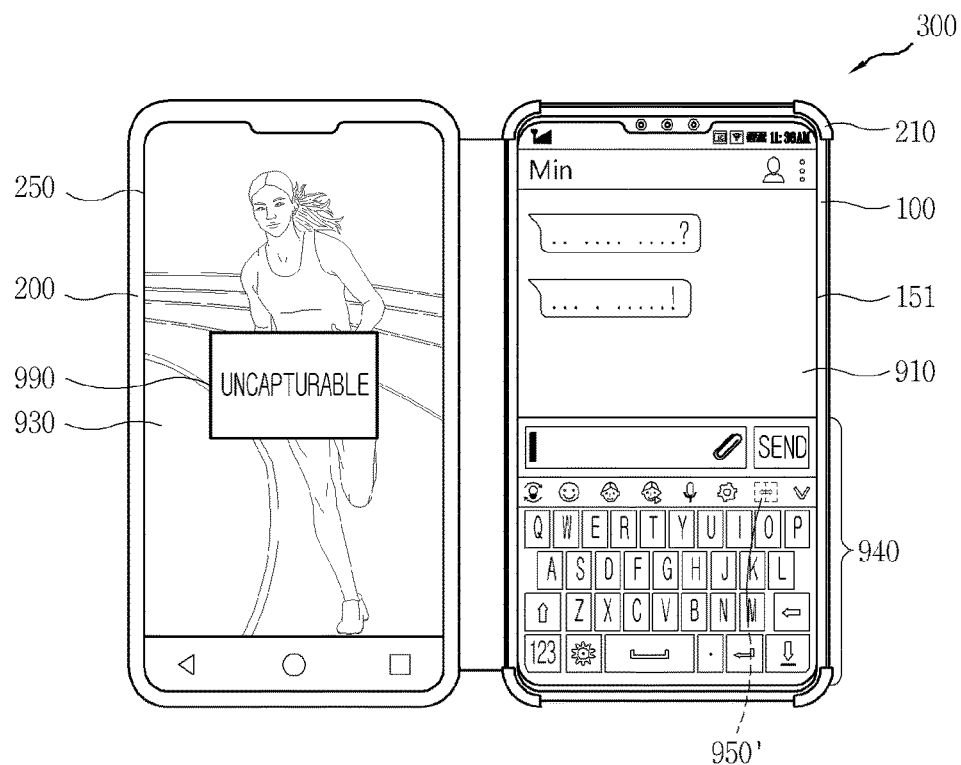

In addition, according to an embodiment, while a screen uncapturable is displayed on the second display 250, when an input for performing the capture and the insertion is performed successively, the controller 180 of the mobile terminal outputs guidance information indicating the a screen is uncapturable. Specifically, the icon 950' for performing the capture and the insertion is displayed in the inactivated state on the input area of the first display 151. At this time, when a touch input applied a predetermined number of times or more to the icon 950' is continuously detected, as illustrated in FIG. 9B, guidance information 990 indicating that a screen is uncapturable pops up on the second display 250. The guide information 990 that pops up disappears after a predetermined time elapsed.

An operation within the mobile terminal 100, which is associated with this, is as follows.

The controller 180 of the mobile terminal 100 receives touch signals that correspond to touch inputs which are applied successively to the icon displayed in the inactivated state on the input area of the first display 151. The controller 180 generates a control signal (hereinafter referred to as "third control signal") for outputting guidance information (or alerting information) indicating that the screen information displayed on the second display 250 is uncapturable. The third control signal is transferred to the second display 250 through the first wireless communication unit 116 and the second wireless communication unit 283. According to the third control signal, the alerting information indicating that currently-displayed screen information is uncapturable is output on the second display 250.

On the other hand, in another example, the guidance information 990 is output on an edge area (for example, an upper end or a lower end) of the second display 250, or displayed within the input area of the first display 151, and then disappears, such that covering of a current display state is minimized.

In addition, in a case where the screen information displayed on the second display 250 is a screen uncapturable, the message inputting is also performed through the first display 151 while viewing the screen information displayed on the second display 250.

FIGS. 10A to 10E illustrate an embodiment in which a screen that is viewed on the first display 151 is transferred to the second display 250 and in which the transferred screen is then captured and is inserted immediately in a message. Because of this, the user can continue to view a screen that is currently displayed, without any interruption, and, at the same time, can immediately share this screen, as a still image, with the third party.

Figure 10A:
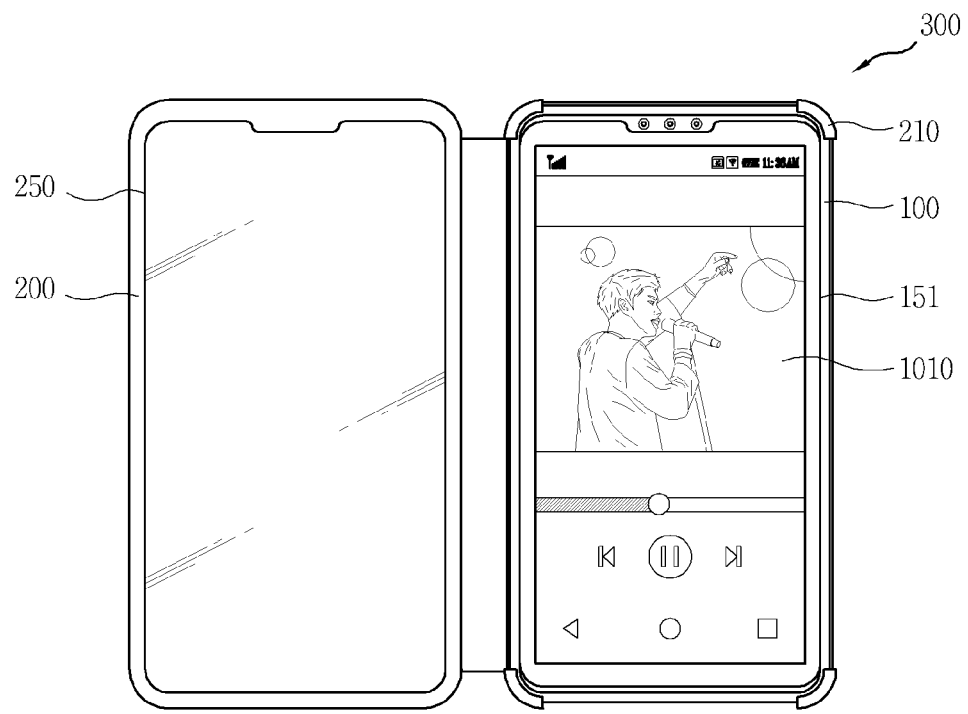
FIGS. 10A, 10B, 10C, 10D, and 10E are exemplary conceptual diagrams for describing an operation in which a screen that is being viewed on the display of the mobile terminal is transferred and then the transferred screen is captured and inserted into a message, in the electronic device according to the present disclosure.

With reference to FIG. 10A, the first screen information, for example, a moving image reproduction screen 1010, is displayed on the first display 151, and the second display 250 is in the inactivated state (an "initial state") or the home screen is displayed on the second display 250. While viewing the first screen information displayed on the first display 151, the user may want to share it with the third party through a message or the like. In this case, the first screen information is sent to the second display 250 and is used like the second screen information.

Figure 10B:
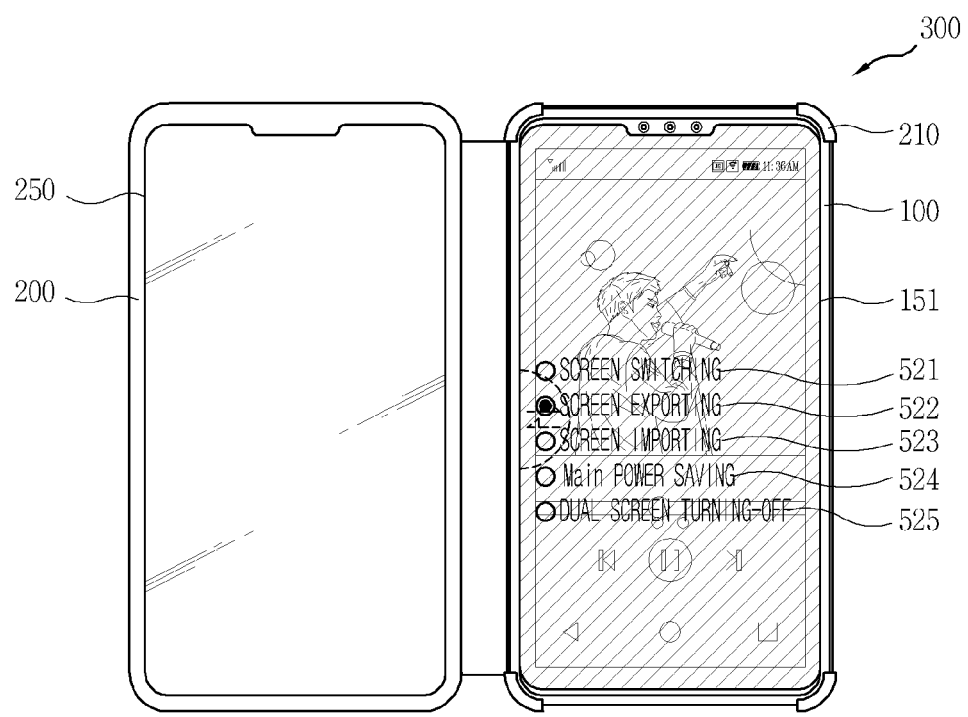

To this end, as illustrated in FIG. 10B, when the screen exporting menu 522 is selected from among the menus 521, 522, 523, 524, and 525 for conjunctional control of the second display 250, which are displayed on the first display 151, the controller 180 of the mobile terminal 100 generates a control signal for sending the moving image reproduction screen 1010 reproduced on the first display 151. Then, the controller 180 moves a task (for example, moving image reproduction) in the memory stack for the first display 151 to a separate memory stack allocated for the second display 250.

In addition, the controller 180 of the mobile terminal transfers the second screen information (which here means the first screen information transferred from the first display 151) displayed on the second display 250, and data associated with execution of an application corresponding to the second screen information, to the second display 250.

Figure 10C:
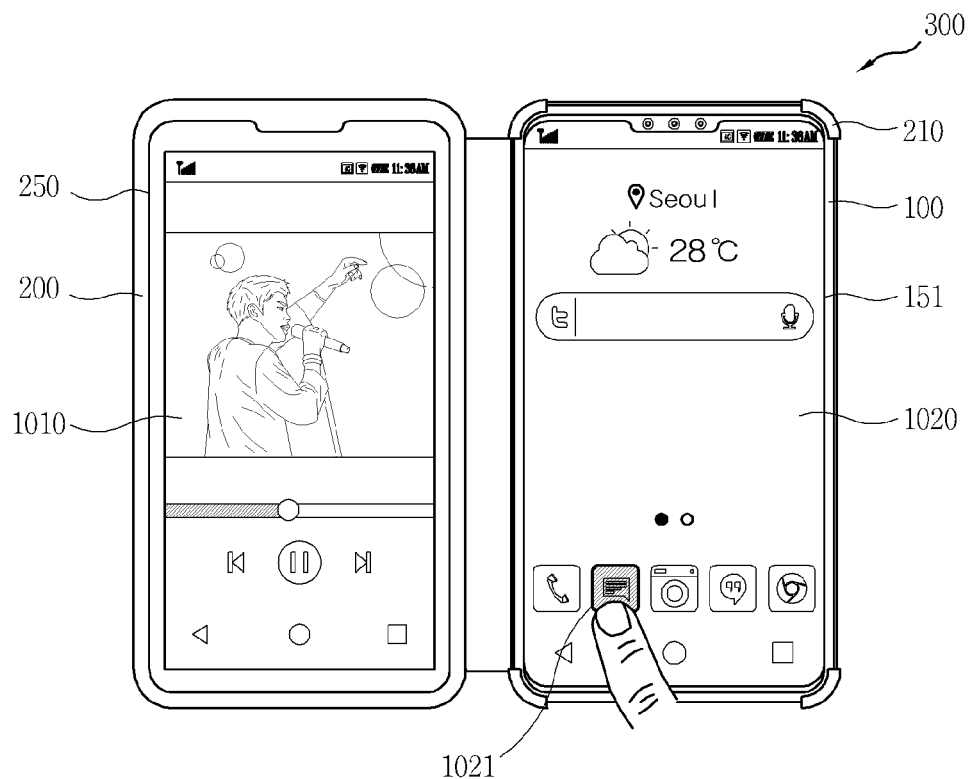

At this time, a screen information 1010 reproduced on the first display 151 is reproduced on the second display 250. Then, when a different task that is being performed in the background on the first display 151 is not present, as illustrated in FIG. 10C, a home screen 1020 is output on the first display 151.

Figure 10D:
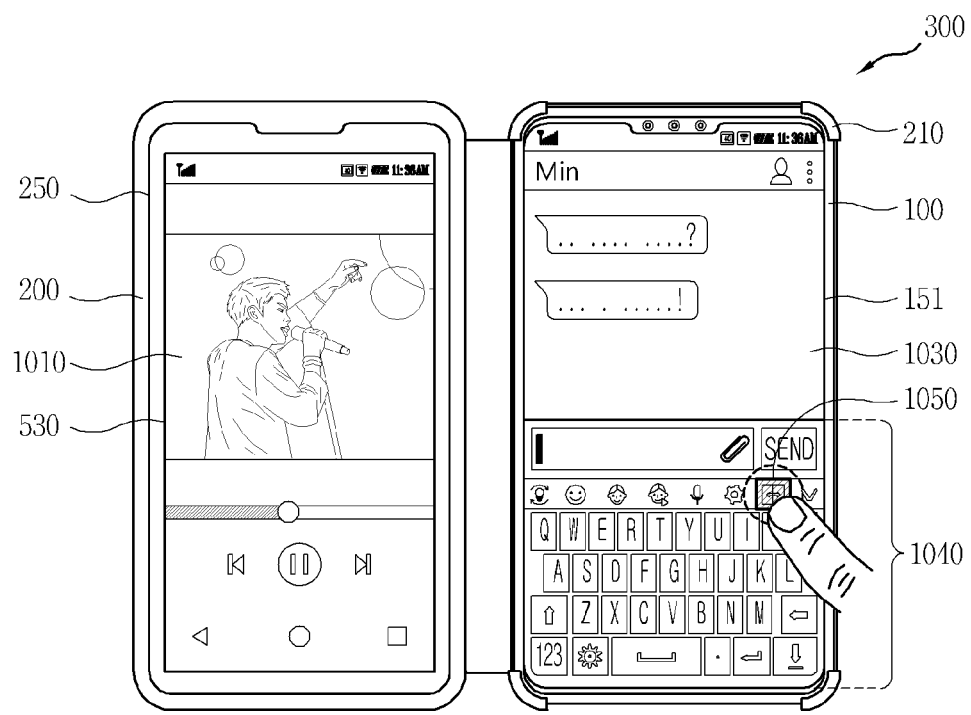

When an icon 1021 for a message application is selected from the home screen 1020 displayed on the first display 151 and a specific conversation screen is displayed, as illustrated in FIG. 10D, a conversation screen 1030 including an input area 1040 is output on the first display 151. At this time, an icon 1050 for capturing and inserting the screen information 1010 that is being reproduced on the second display 250 is displayed in the activated state on the input area 1040. Then, the screen information 1010 continues to be reproduced on the second display 250.

Figure 10E:
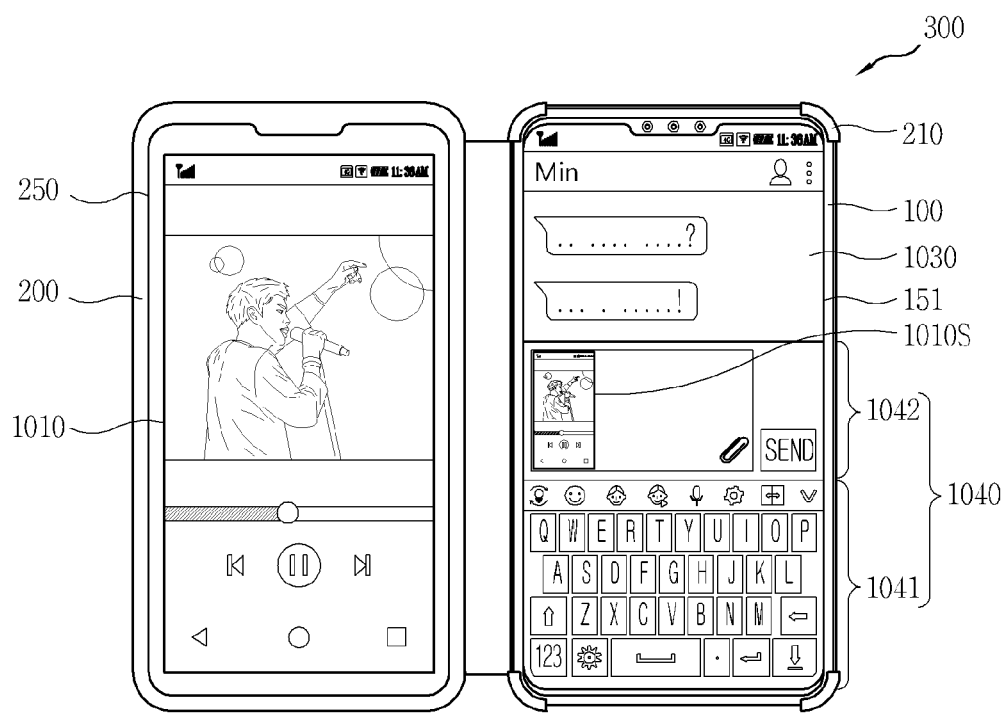

When a touch is applied to the icon 1050 displayed on the input area 1040, the controller 180 of the mobile terminal 100 captures a scene of the second display 250 at a point in time when a touch is applied, and, as illustrated in FIG. 10E, attaches the captured scene to a display area 1042 of the input area 1040 of the first display 151. At this time, after the capture, the reproduction on the second display 250 continues from the captured scene. Accordingly, the user can continue the message conversation without any interruption through the first display 151 while continuing to view the screen information 1010 that is reproduced through the second display 250.

On the other hand, the embodiments according to the present disclosure, which are described above, also find wide application in a case where a structure in which the first display 151 and the second display 250 are independent of each other is not employed and where one display is divided in software, or in a case where one display is folded and thus is partitioned/divided into a plurality of display areas.

As described above, an electronic device according to the present disclosure, which includes a mobile terminal, includes a case that includes a first body with which the mobile terminal is combined and a second body in which a display is provided. A wireless communication unit is provided in the case such that wireless communication with the mobile terminal is possible, and the display provided in the second body transmits and receives a control signal and data to and from the mobile terminal through the wireless communication unit provided in the case. In addition, according to the present disclosure, only with one expanded display conjunction function, screen information that is being output on a different screen is immediately shared as message contents while message conversation is in progress. With a one-time touch input, the user can perform an operation that was performed through various steps. Furthermore, display states of a keyboard area for message inputting and of the screen information that is being output on a different screen are maintained as before. Thus, the user convenience and the usability are further improved.

What is claimed is:

1. An electronic device, the electronic device comprising:
a mobile terminal including a terminal body, a controller, and a first display, and
a case coupled to the mobile terminal,
wherein the case includes:
a first body that is formed to accommodate at least one portion of the terminal body,
a second body in which a second display is disposed, and
a wiring unit that electrically couples the first body and the second body to transfer data received from the mobile terminal to the second display,
wherein, a first screen information including an input area is displayed on the first display and a second screen information is displayed on the second display, and the controller of the mobile terminal controls the wiring unit, the wireless communication unit, the first is configured to:
capture the second screen information displayed on the second display in response to receiving a predetermined input to the input area; and
cause the first display to display the captured second screen information in the input area of the first screen information.

2. The electronic device of claim 1,
wherein the predetermined input corresponds to a touch input associated with a capture icon for performing capture of the second screen information displayed on the second display, wherein the capture icon is displayed in the input area.

3. The electronic device of claim 2,
wherein the input area includes a keyboard area configured to receive a key input and a display area configured to display a result of received key inputs, and
wherein the controller is further configured to cause the captured second screen information to be displayed in the display area after a predetermined period of time following the touch input.

4. The electronic device of claim 2,
wherein the capture icon is displayed in a deactivated state when it is determined that capture of the second screen information is not possible.

5. The electronic device of claim 4,
wherein the controller is further configured to cause the second display to output alert information indicating that capture of the second screen information is not possible when successive inputs are received to the capture icon displayed in the deactivated state.

6. The electronic device of claim 1,
wherein the first screen information corresponds to a message application and the second screen information corresponds to an application different from the message application, and
wherein the second screen information is still displayed on the second display after the captured second screen information is inserted into the input area of the first screen information.

7. The electronic device of claim 1, wherein the controller is further configured to cause the second display to:
switch to displaying an image of the captured second screen information in response to detecting the predetermined input; and
display a tool area for image editing on one area of the displayed image of the captured second screen information for a predetermined time.

8. The electronic device of claim 7,
wherein the displayed image of the captured second screen information is edited based on one or more inputs applied to the tool area, and
wherein the controller is further configured to further to cause the first display to display the edited image in the input area in response to receiving an editing completion input to the second display.

9. The electronic device of claim 1,
wherein the controller is further configured to transfer the second screen information is-displayed on the first display and data associated with execution of an application corresponding to the second screen information to the second display in response to receiving a screen exporting request to the first display.

10. The electronic device of claim 9,
wherein, while the transferred second screen information is displayed on the second display, the controller is further configured to capture the transferred second screen information and cause the captured transferred second screen information to be displayed into the input area of the first screen information based on a touch input applied to the input area of the first screen information corresponding to a message application executed on the first display.

11. A method of operating an electronic device including a mobile terminal and a case coupled to the mobile terminal, the method comprising:
displaying a first screen information including an input area on a first display of the mobile terminal;
displaying a second screen information on a second display of the case;
detecting, at the mobile terminal, a predetermined input applied to the input area displayed on the first display of the mobile terminal;
capturing second screen information displayed on the second display of the case in response to receiving the predetermined input; and
displaying the captured second screen information in the input area displayed on the first display of the mobile terminal.

12. The method of claim 11,
wherein the predetermined input is a touch input applied to a capture icon displayed in the input area.

13. The method of claim 11, wherein:
the first screen information corresponds to a message application and the second screen information corresponds to an application different from the message application; and
wherein the second screen information is still displayed on the second display after the captured second screen information is inserted into the input area of the first screen information.

14. The method according to claim 11, further comprising:
switching the second display to display an image of the captured second screen information in response to detecting the predetermined input; and displaying a tool area on the second display for image editing; on one area of the displayed image of the captured second screen information for a predetermined time.

15. The method according to claim 14, further comprising:
   editing the displayed image of the captured second screen information based on one or more inputs applied to the tool area; and
   displaying the edited image in the input area on the first display in response to receiving an editing completion input to the second display.

16. A machine-readable non-transitory medium having stored thereon machine-executable instructions to be executed by a mobile terminal for:
   displaying a first screen information including an input area on a first display of the mobile terminal;
   displaying a second screen information on an external second display coupled to the mobile terminal;
   detecting a predetermined input applied to the input area displayed on the first display;
   capturing the second screen information displayed on the second display in response to the predetermined input; and
   receiving data corresponding to the captured second screen information and displaying the received data in the input area displayed on the first screen information on the first display.

17. A mobile terminal comprising:
   a first display;
   a terminal body configured to be coupled to a case having a second display;
   one or more pins configured to transmit and receive information to and from corresponding one or more pins located at the case, wherein the one or more pins are disposed at an exterior surface of the terminal body; and
   a controller configured to:
   cause the first display to display a first screen information including an input area on the first display;
   receive a predetermined input applied to the input area displayed on the first display of the mobile terminal;
   capture second screen information displayed on the second display of the case in response to receiving the predetermined input; and
   cause the first display to display the captured second screen information in the input area displayed on the first screen information.

* * * * *